(12) United States Patent
Takagi

(10) Patent No.: US 7,204,786 B2
(45) Date of Patent: Apr. 17, 2007

(54) HYDRAULIC PRESSURE CHARACTERISTIC VALUE SETTING METHOD FOR AUTOMATIC TRANSMISSION

(75) Inventor: Kiyoharu Takagi, Okazaki (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 228 days.

(21) Appl. No.: 11/062,704

(22) Filed: Feb. 23, 2005

(65) Prior Publication Data
US 2005/0187070 A1   Aug. 25, 2005

(30) Foreign Application Priority Data

| Feb. 23, 2004 | (JP) | ............................. 2004-046105 |
| Feb. 23, 2004 | (JP) | ............................. 2004-046122 |
| Feb. 23, 2004 | (JP) | ............................. 2004-046125 |

(51) Int. Cl.
*B60W 10/04* (2006.01)
(52) U.S. Cl. ...................................................... 477/94
(58) Field of Classification Search ................ 477/94, 477/98; 701/59
See application file for complete search history.

(56) References Cited

U.S. PATENT DOCUMENTS

| 6,658,341 B2 | 12/2003 | Inoue et al. |
| 6,931,315 B2* | 8/2005 | Ayabe et al. .................. 701/59 |
| 7,090,614 B2* | 8/2006 | Takagi .......................... 477/61 |
| 2003/0216218 A1* | 11/2003 | Takagi et al. ................. 477/70 |

* cited by examiner

*Primary Examiner*—Dirk Wright
(74) *Attorney, Agent, or Firm*—Buchanan Ingersoll & Rooney PC

(57) ABSTRACT

A hydraulic pressure characteristic value setting method for an automatic transmission comprises processes; disengaging one of friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, and disengaging the engaged friction engaging element when a predetermined guard condition has been fulfilled.

16 Claims, 10 Drawing Sheets

FIG. 2

|  |  | C1 | C2 | C3 | B1 | B2 |
|---|---|---|---|---|---|---|
| R range | R |  |  | O |  | O |
| N range | N |  |  |  |  | O |
| D range | N |  |  |  | (O) | O |
|  | First speed | O |  |  |  | O |
|  | Second speed | O |  |  | O |  |
|  | Third speed | O |  | O |  |  |
|  | Forth speed | O | O |  |  |  |
|  | Fifth speed |  | O | O |  |  |
|  | Sixth speed |  |  |  | O |  |

O:Engaging,  Empty:Disengaging

HYDRAULIC PRESSURE CHARACTERISTIC VALUE SETTING METHOD FOR AUTOMATIC TRANSMISSION

This application is based on and claims priority under 35 U.S.C. § 119 to Japanese Patent Application 2004-046105, filed on Feb. 23, 2004, Japanese Patent Application 2004-046122, filed on Feb. 23, 2004 and Japanese Patent Application 2004-046125, filed on Feb. 23, 2004, the entire content of which is incorporated herein by reference.

FIELD OF THE INVENTION

The present invention generally relates to a hydraulic pressure characteristic value setting method for an automatic transmission.

BACKGROUND

A known method for directly controlling a hydraulic pressure that is applied to a friction engaging element from a hydraulic pressure source by means of an electromagnetic valve without an accumulator has been disclosed. To realize a smooth and high-response transmission feeling, it is important to obtain a hydraulic pressure characteristic value used for the hydraulic pressure control (piston stroke control) which is applied to the friction engaging element. In US2003-0216218A1, which is filed by a applicant of the present invention, a learning method is disclosed, wherein a pre-charge maximum time and a stand-by pressure are set as the hydraulic pressure characteristic values in accordance with variation in a turbine rotation number Nt. The pre-charge maximum time is used in an initial stage when the hydraulic oil is rapidly applied to the friction engaging element, and the stand-by pressure is used for maintaining the friction engaging element at a position right before its engagement. According to the known method, entire individual differences, which will occur in an initial stage of the shipment, can be eliminated, and then the hydraulic pressure characteristic value can be set and learned by a service staff of a car dealer even when the automatic transmission whose hydraulic pressure characteristic value can be set has been shipped.

If the hydraulic pressure characteristic value will be set and learned by the service staff (operator) of the car dealer, operational behavior of the operator needs to be considered. For example, during the learning control, if the accelerator is pressed or released by little and little when the vehicle is in an idling state, an accurate learning result may not be obtained.

Further, the learning control is required after an engine rotation number is increased by pressing down the accelerator so as to stabilize the engine rotation number, an accurate learning result may not be obtained due to differences of the operational behavior of the operator. For example, if the operator sees an instruction saying "press down on the accelerator so as to stabilize as possible", the level of the pressing may vary from person to person, as a result, the learning result may vary. In the same manner, the operator may release the accelerator before the engine rotation number has not stabilized for a predetermined time period. Such problem may be solved if instructions have made in detail, however it is considered that more stabilized result can be obtained if the differences depending on the operator's behavior can be eliminated by controlling on the automatic transmission side.

Thus, a need exist for an hydraulic pressure characteristic value to eliminate not only differences depending on each automatic transmission unit but also differences depending on the operator's behavior.

Another known method for directly controlling a hydraulic pressure that is applied from a hydraulic pressure source by means of an electromagnetic valve without an accumulator to a friction engaging element (a friction clutch or a friction brake) so as to be engaged or disengaged is disclosed.

In the process for controlling a hydraulic pressure applied to the friction engaging element of the automatic transmission, a pre-charge operation is executed during a first stage of a piston stroke by increasing the amount of the hydraulic oil so as to be rapidly applied to the friction engaging element. And then, the amount of the hydraulic oil is reduced so as to maintain the friction engaging element at a low hydraulic pressure (stand-by pressure) that corresponds to a pressure of a return spring for a predetermined time period so as to prevent a surge pressure upon a stroke end.

Further, the hydraulic pressure control characteristic during the pre-charge process may vary depending on individual differences of the automatic transmission or the engine. According to the know method, the individual differences, which will occur in an initial stage the shipment, can be eliminated. Specifically, a guard method for disengaging the friction engaging element when a variation range of the turbine rotation number reaches a predetermined guard rotation number is provided in the know method. More specifically, the guard method can avoid damage on the friction engaging element because of the friction engaging element slides for a long time period when the hydraulic pressure characteristic value has not determined during the hydraulic pressure characteristic value setting, or avoid mechanical damage on the friction engaging element because of an excessive torque applied for a long time period to the friction element in the pre-charge process [US2003-0216218A1].

For automating the manual transmission (MT), a torque point learning method is disclosed in U.S. Pat. No. 6,658,341B2. In the torque point learning method, a torque point of a multi-plate wet clutch that is provided between the torque converter and the MT, can be learned by the drover. In this method, the engaged clutch is disengaged when one of the following conditions is fulfilled so as to prevent MT from being malfunctioning or mechanical damaging. (1) A difference ([N) between the engine rotation number (Ne) and the turbine rotation number (Nt) becomes equal to or more than a predetermined number (e.g.[N[300 rpm), or the difference ([N) between the engine rotation number (Ne) and the turbine rotation number (Nt) becomes equal to a engine rotational difference ([ Ne[50 rpm)This condition includes the torque point condition. (2) The vehicle starts traveling (speed≠0 km/h). This condition presumes a case when some kind of problem has occurred on MT.

(3) Knob switches on the first, third and fifth speed are turned on. In this condition, it is determined that the drive made a miss operation. (4) The engine rotation number becomes away from the engine rotation number upon the idling state (Ne[300 rpm or [80 rpm). This condition presumes a case when some kind of problem has occurred on MT. (5) The parking brake is released. In this condition, it is determined that the drive made a miss operation. (6) The foot grace is released. In this condition, it is determined that the drive made a miss operation.

However, the known guard method during the hydraulic pressure characteristic value setting (learning) is a minimum guard in consideration with a safety matter, and in may happen when the hydraulic pressure characteristic value is learned after the vehicle is shipped that the setting process can not be finished because the hydraulic pressure characteristic value has not been determined. Further, there is a need to improve safety of the guard method to prevent the automatic transmission or MT from being malfunctioned or mechanical damaged.

Thus, a need exists for a guard method and a control device for executing the guard method, which are executed in the hydraulic pressure characteristic value setting, to prevent the automatic transmission from being malfunctioned or mechanical damaged.

Further, another need exists for a guard method and a control device for executing the guard method, which are executed in the hydraulic pressure characteristic value setting, to notice promptly that the determination in the hydraulic pressure characteristic value setting (learning).

Still another known method for directly controlling a hydraulic pressure that is applied to a friction engaging element from a hydraulic pressure source by means of an electromagnetic valve without an accumulator has been disclosed. To realize a smooth and high-response transmission feeling, obtaining a hydraulic pressure characteristic value used for the hydraulic pressure control (piston stroke control) which is applied to the friction engaging element is important.

In this circumstance, a method for learning the hydraulic pressure characteristic value by directly detecting a position of the clutch piston, a method for learning the hydraulic pressure characteristic value by directly detecting the hydraulic pressure and a method for learning the hydraulic pressure characteristic value by directly detecting the torque, have been proposed. It is well known that a value of the clutch stroke can be detected on a dry-type friction clutch, however according to a wet-type friction clutch, the stroke amount of the clutch piston is small (e.g. 2 mm), so that the accuracy on the stroke sensor needs to be improved for directly detecting the position of the clutch piston. If the stroke sensor is improved, the cost of the automatic transmission is increased. Further, such stroke sensor may be applied to the brake, however application to the clutch is practically difficult.

The applicant of the present invention disclosed a method for executing the learning the hydraulic pressure characteristic value in accordance with variation in the turbine rotation number Nt in US2003-0216218A1. This method, in which the hydraulic pressure characteristic value is determined in accordance with variation in the turbine rotation number, has many advantages comparing to the above methods. The applicant also disclosed a method for executing the learning for the pre-charge maximum time, which is used when the hydraulic oil is rapidly applied to the friction engaging element during an initial period of the hydraulic pressure application process, and for the stand-by pressure, which is used for maintaining the friction engaging element at a position right before it moves to be engaged.

In the learning of the stand-by pressure, an accurate return spring corresponding pressure can be obtained by driving the clutch piston so as to increase in an stepped hydraulic wave form, in which a step pressure is small with enough intervals. The variation in the turbine rotation number is very slow, so that a threshold of the variation in the turbine rotation number needs to be reduced to prevent the determination from being delayed, however, the sensor for detecting the turbine rotation number has a limitation. There is no problem if all the friction engaging elements has allowance to the threshold, however, allowance may differ depending on each of the friction engaging element, and some friction engaging element, whose relative rotation number is small, and torque division ration relative to the input torque is small, has little allowance to the threshold.

In addition, the deceleration of the turbine rotation number may further be gentle due to an actuation of the accumulator, leaking from a seal portion (e.g. damage on an O-ring), a slow actuation on a control valve (stuck) or the smaller actual pressure than a indicated pressure, and the determination on the stand-by pressure may delays.

To prevent the delay of the determination, a predetermined standard may be provided so as to eliminate the value if the is out of the standard (not using the leaned value), however, according to the method disclosed by the applicant of the present invention, even when the process has passed a point, at which the determination should have made, the pressure is applied to the friction engaging element, so that the deceleration of the turbine rotation number is increased, as a result, the value always enters the standard range. Even when the value is in the standard range, the value exceeds the true value, which result in an engagement to the end upon an actual transmission.

Similar problems has been seen when the hydraulic pressure variation happens while the learning of the pre-charge maximum time. In the pre-charge maximum time learning, the clutch piston is controlled so as to be engaged with the friction engaging element at a cracking speed. Thus, the deceleration on the turbine rotation number becomes large, and the determination is not diverse.

Further, if the hydraulic pressure variation varies, the pre-charge maximum time extends more or less, and the determination has been finished properly, so that it cannot be distinguished whether or not hydraulic pressure variation happens. In most cases, a difference on the pre-charge maximum time, which is occurred depending on whether or not the hydraulic pressure variation exist is small, and the learning value when the hydraulic pressure variation occurs enters within the production standard. If the hydraulic pressure variation is identical with a hydraulic pressure variation occurred in an actual transmission, a transmission shock can be comprehend due to the hydraulic pressure variation. However, if the hydraulic pressure variation is not identical with a hydraulic pressure variation occurred in an actual transmission, a end engagement may happens, which result in a transmission shock.

Specifically, without damage on the learning of the stand-by pressure and pre-charge maximum time, it will be preferable if a measure for the learning value, which is large within a product standard, relative to a true value is considered. Thus, a need exists for a setting method for a hydraulic pressure characteristic value setting to improve the know method disclosed in US2003-0216218A1.

SUMMARY OF THE INVENTION

According to an aspect of the present invention, a hydraulic pressure characteristic value setting method for an automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the hydraulic pressure characteristic value setting method comprises processes of disengaging one of the friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, and disengaging the engaged friction engaging element when a predetermined guard condition has been fulfilled.

According to another aspect of the present invention, a hydraulic pressure characteristic value setting method for an automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the hydraulic pressure characteristic value setting method comprises processes of disengaging one of the friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, dividing a standard range of the hydraulic pressure characteristic value so as to set plural sections from an upper side of the standard range to a lower side of the standard range, setting in advance correction values of the hydraulic pressure characteristic value in respect of each section so as to increase the correction values in incremental steps, and executing a learning by subtracting a correction value in a section where the hydraulic pressure characteristic value obtained in accordance with at least a variation in the speed of turbine rotations exists, from the hydraulic pressure characteristic value obtained in accordance with at least variations in the speed of turbine rotations.

According to further aspect of the present invention, a hydraulic pressure characteristic value setting method for an automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the hydraulic pressure characteristic value setting method comprises processes of disengaging one of the friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, dividing a standard range of the hydraulic pressure characteristic value so as to set plural sections from an upper side of the standard range to a lower side of the standard range, setting in advance correction values of the hydraulic pressure characteristic value in respect of each section so as to increase the correction values in incremental steps, and executing a learning by subtracting a correction value in a section where the hydraulic pressure characteristic value obtained in accordance with at least a variation in the speed of turbine rotations exists, from the hydraulic pressure characteristic value obtained in accordance with at least variations in the speed of turbine rotations.

According to still further aspect of the present invention, an automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the automatic transmission comprises processes of disengaging one of the friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, dividing a standard range of the hydraulic pressure characteristic value so as to set plural sections from an upper side of the standard range to a lower side of the standard range, setting in advance correction values of the hydraulic pressure characteristic value in respect of each section so as to increase the correction values in incremental steps, and executing a learning by subtracting a correction value in a section where the hydraulic pressure characteristic value obtained in accordance with at least a variation in the speed of turbine rotations exists, from the hydraulic pressure characteristic value obtained in accordance with at least variations in the speed of turbine rotations.

According to still another aspect of the present invention, an automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the automatic transmission comprises processes of disengaging one of the friction engaging elements, transmitting turbine rotation to one side of each of the friction engaging elements, securing the other side of each of the friction engaging elements, detecting variations of speed of the turbine rotation by means of a turbine rotation sensor, executing a learning of a hydraulic pressure characteristic value in accordance with at least variations in the speed of turbine rotations when a friction engaging element starts to be engaged, setting a correcting formula so as to increase a correction amount as the hydraulic pressure characteristic value increases, and executing a learning of a corrected hydraulic pressure characteristic value that is calculated by applying the hydraulic pressure characteristic value obtained in accordance with at least a variation of the speed of turbine rotations, into the correcting formula.

BRIEF DESCRIPTION OF THE DRAWINGS

The foregoing and additional features and characteristics of the present invention will become more apparent from the following detailed description considered with reference to the accompanying drawings, wherein:

FIG. 2 illustrates a table showing combinations of an engaging or a disengaging among friction engaging elements of the automatic transmission 1;

DETAILED DESCRIPTION

Figure 1:
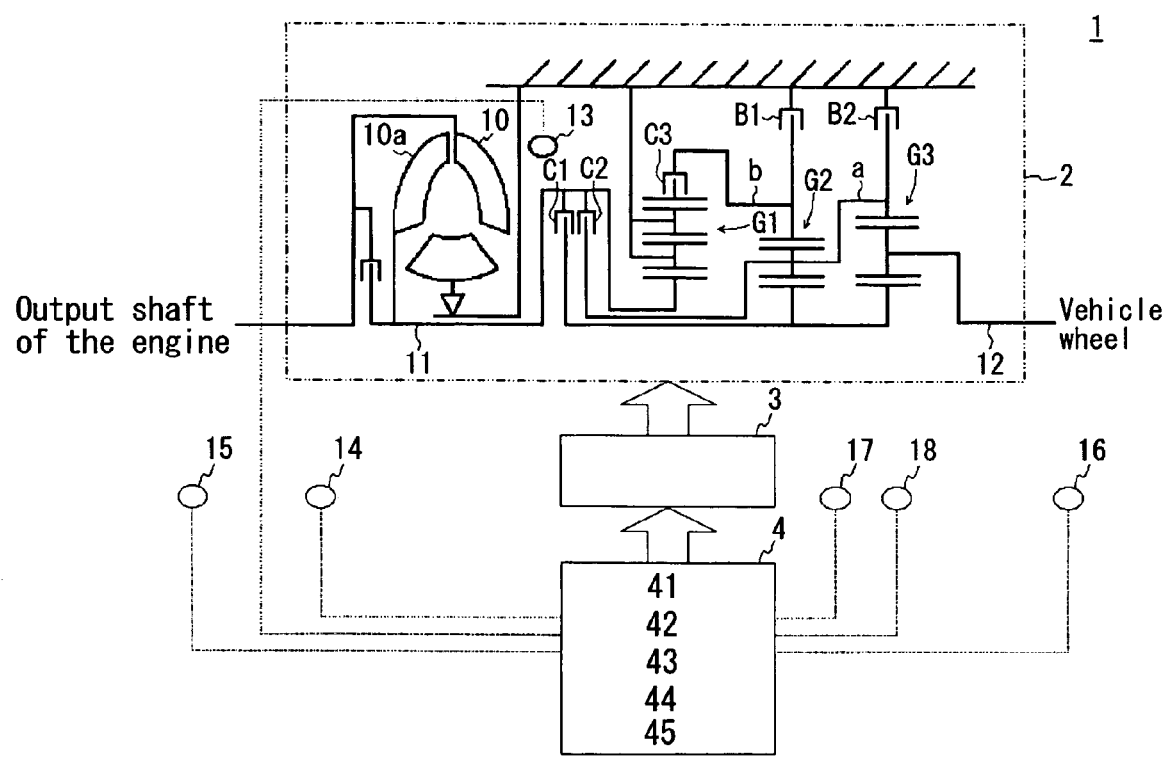
FIG. 1 illustrates a schematic view which indicating an entire configuration of an automatic transmission 1 according to the present invention.

FIG. 1 illustrates a schematic view of an automatic transmission 1 according to the present invention. The automatic transmission 1 includes a transmission unit 2, a hydraulic pressure control portion 3, and an electronic control portion 4 (control portion).

The transmission unit 2 is connected to the output shaft (not shown) of an engine so as to transmit rotations of the engine to the vehicle wheels. The transmission unit 2 includes a torque converter 10, which is connected to the output shaft of the engine, an input shaft 11, which is connected to a turbine 10*a* of the torque converter 10, an output shaft 12, which is connected to the vehicle wheel by means of a differential gear, the double pinion planetary gear G1 on the first column, and the single pinion planetary gears G2 and G3 on the second and third columns. The transmission unit 2 houses a first friction clutch C1, a second friction clutch C2, a third friction clutch C3, a the first friction brake B1 and a second friction brake B2; which serve as hydraulic-transmitting-type plural (five) friction engaging elements. By means of the hydraulic pressure control portion 3 and the electronic control portion 4, the transmission unit 2 achieves shift changes by selecting engagements or disengagements among the first friction clutch C1, the second friction clutch C2, the third friction clutch C3, the first friction brake B1 and the second friction brake B2. Each of the first friction clutch C1, the second friction clutch C2, the third friction clutch C3, the first friction brake B1 and the second friction brake B2 require high pressure so as to be engaged, and require low pressure so as to be disengaged.

The hydraulic pressure control portion 3 is controlled by the electronic control portion 4 so as to switch a hydraulic circuit inside of the transmission unit 2, and the hydraulic pressure control portion 3 selects the friction engaging elements (engagements and disengagements among the friction engaging elements) for supplying the hydraulic pressure so as to control the hydraulic pressure applied to the friction engaging elements.

The electronic control portion 4 includes a micro computer, input/output signals from each of the sensors, and control the hydraulic pressure control portion 3 based on the signals. The electronic control portion 4 includes a securing means 41, and actuating means 42, a detecting means 43, a setting means 44 and a disengaging means 45. The securing means 41 controls one of one of the friction engaging elements to be engaged by controlling the hydraulic pressure, transmits the turbine rotation to one side of each of the friction engaging element and secures the other side of each of the friction engaging element. The actuating means 42 moves the friction engaging element so as to be engaged by controlling the hydraulic pressure. The detecting means 43 detects a variation on the turbine rotation number by means of the turbine rotation sensor when the friction engaging element is moved so as to be engaged. The setting means 44 executes the learning for the hydraulic pressure characteristic value at an initial point when the friction engaging element is engaged based on the variation in the turbine rotation number. The disengaging means 45 disengages the engaged friction engaging element based on predetermined information. The electronic control portion 4 includes a timer function at the microcomputer. A turbine rotation number sensor 13 is provided at the automatic transmission for detecting the turbine rotation number Nt of the input shaft (turbine 10*a*). Signals from the turbine rotation number sensor 13 are also input into the electronic control portion 4. A position sensor 14 is provided at the automatic transmission for detecting a position of the selector lever (not shown), which is operated by a driver, specifically, detecting a drive range (R range, N range or D range). Signals from the position sensor 14 are also input into the electronic control portion 4. An engine rotation number sensor 15 for detecting the engine rotation number Ne is provided. Signals from the engine rotation number sensor 15 are also input into the electronic control portion 4. A brake switch 16 for detecting whether or not the brake pedal is pressed is provided. Signals from the brake switch 16 are also input into the electronic control portion 4. A temperature sensor 18 for detecting a temperature of the hydraulic oil, which is applied to the friction engaging element s provided at a predetermined position of a hydraulic circuit. Signals from the temperature sensor 18 are also input into the electronic control portion 4.

Next, transmission ratio which are achieved by combinations of engagement/disengagement among a first friction clutch C1, a second friction clutch C2 and a third friction clutch C3, a first friction brake B1 and a second friction brake B2 will be explained in accordance with FIG. 2.

The automatic transmission 1 achieves one reverse traveling shift, neutral and six forward traveling shifts depending on combinations among the friction engaging elements.

Specifically, the forward traveling shifts includes under drives, which consists of the first, second, third and fourth speeds, and over drives, which consists of the fifth speed and the sixth speed. For example, when each of the third friction clutch C3 and the second friction brake B2 is engaged, the rotation of the input shaft 11 is reversed and transmitted to the output shaft 12 so as to move the vehicle in a rear direction. Further, when only the second friction brake B2 is engaged, the transmission shift becomes neutral, and when each of the first friction clutch C1 and the second friction brake B2 is engaged, the transmission shift becomes the first speed. Further more, each of the first friction clutch C1 and the first friction brake B1 is engaged, the transmission shift becomes the second speed. In the same manner, when each of the first friction clutch C1 and the third friction clutch C3 is engaged, the transmission shift becomes the third speed; when each of the first friction clutch C1 and the second friction clutch C2 is engaged, the transmission shift becomes the fourth speed; when each of the second friction clutch C2 and the third friction clutch C3 is engaged, the transmission shift becomes the fifth speed, and when each of the second friction clutch C2 and the first friction brake B1 is engaged, the transmission shift becomes the sixth speed.

When the transmission shift is changed from the first speed to the second speed, the electronic control portion 4 controls the second friction brake B2 to be disengaged (released) by means of the hydraulic pressure control portion 3 and controls the first friction brake B1 to be engaged. In addition, when the transmission shift is changed from the second speed to the third speed, the electronic control portion 4 controls the first friction brake B1 to be disengaged (released), and controls the third friction clutch C3 to be engaged. Furthermore, when the transmission shift is changed from the third speed to the fourth speed, the electronic control portion 4 controls the third friction clutch C3 to be disengaged (released), and controls the second friction clutch C2 to be engaged. When the transmission shift is changed from the fourth speed to the fifth speed, the electronic control portion 4 controls the first friction clutch C1 to be disengaged (released), and controls the third friction clutch C3 to be engaged. When the transmission shift is changed from the fifth speed to the sixth speed, the electronic control portion 4 controls the third friction clutch C3 to be disengaged (released), and controls the first friction brake B1 to be engaged.

As shown in FIG. 2, in a normal transmission control, when R range is selected by the selector lever, the vehicle travels backward, when N range is selected by the selector lever, the vehicle is in a neutral state, and when D range is selected by the selector lever, the vehicle is in a neutral state, first speed, second speed, third speed, fourth speed, fifth speed or sixth speed.

First Embodiment

As shown in FIG. 1, an electronic control portion 4 includes a microcomputer, which inputs the output signals from various sensors and control to drive a hydraulic pressure control portion 3 based on the signals. In the present embodiment, the automatic transmission includes 1 a input shaft 11 of a transmission unit 2, a turbine rotation sensor 13 for detecting a turbine rotation number Nt of a turbine 10a, a position sensor 14 for detecting a the running range (R range, N range or D range) of a selector lever that is operated by a driver, an engine rotation sensor 16 for detecting the engine rotation number Ne, and an accelerator opening sensor for detecting the accelerator opening. The turbine rotation number Nt and the running range are input into the electronic control portion 4. The electronic control portion 4 is adapted to control a lamp 15 to be on/off. The lamp 15 includes an existing configuration such as a AT warning on a driver's seat or an over drive lamp.

A setting method of the hydraulic pressure characteristic value of the automatic transmission 1, which includes the above configuration, will be explained below. When a first operation (e.g. switching operation of the specific pattern of the select lever) is executed, the electronic control portion 4 proceeds from a normal mode (left diagram in FIG. 3) to a stand-by mode (central diagram in FIG. 3), in which the hydraulic pressure characteristic value is ready to proceed to a learning mode. When the electronic control portion 4 proceeds to the stand-by mode (central diagram in FIG. 3), the electronic control portion 4 controls the lamp 15 to blink in the lighting pattern A1 so as to notice the operator that the hydraulic pressure characteristic value proceeds to the stand-by mode (central diagram in FIG. 3).

In the stand-by mode (central diagram in FIG. 3), if conditions for executing the learning are met, specifically, the select lever is selected to a certain range, or the engine rotation number is stabilized, the electronic control portion 4 controls the lamp 15 to blink in the lighting pattern A2 so as to notice the operator that the hydraulic pressure characteristic value can proceed to the learning mode.

When the operator confirms the lamp 15 blinking in the lighting pattern A2 and operates an predetermined second operation such as a operation of an OD (Over Drive) switch, the electronic control portion 4 proceeds the hydraulic pressure characteristic value to the learning mode (right diagram in FIG. 3), the learning control ("determining" in FIG. 4) of the pre-charge maximum time depending on the significant change of the turbine rotation number Nt by applying the pre-charge pressure to the friction engaging element that corresponds to the selected running range, and the learning control ("determining" in FIG. 5) of the stand-by pressure (equivalent pressure to the return spring) depending on the significant change of the turbine rotation number Nt by controlling the hydraulic pressure so as to be in a stepped form to the friction engaging element are executed (in random order).

While the learning control has been executed, the electronic control portion 4 controls the lamp 15 to blink in the lighting pattern B1 so as to notice the operator that the learning process of the hydraulic pressure characteristic value has been executed.

Further, while the learning control has been executed, the electronic control portion 4 monitors the turbine rotation number Nt, the engine rotation number Ne, and the accelerator opening at predetermined intervals so as to determine whether or not the monitored values fulfill the following guard conditions.

(guard condition 1) turbine rotation number Nt □turbine rotation number Nt_i under an idling state×guard ratio□ (□□1);

(guard condition 2-1) turbine rotation number Nt □engine rotation number Ne, occurs predetermined number of times continuously;

(guard condition 2-2) turbine rotation number Nt □engine rotation number Ne, occurs predetermined number of times in an accumulation;

(guard condition 3-1) accelerator opening□accelerator and guard value, occurs predetermined number of times continuously, and (guard condition 3-2) the accelerator opening□the accelerator and guard value, occurs predetermined number of times in an accumulation.

If It is presumed that the learning is not executed accurately even when the above guard conditions are fulfilled, the electronic control portion 4 controls the lamp 15 to blink in the lighting pattern B2 so as to notice the operator that the learning operation is needed to be repeated.

On the other hand, when the guard condition is not fulfilled, the learning result is within a predetermined standard range, and the accelerator is returned by the operator, and the learning is normally executed, the electronic control portion 4 turns off the lamp 15 during a predetermined time period so as to notice the operator that the learning operation has been normally finished. After the lamp 15 is turned off during the predetermined time period, the electronic control portion 4 proceeds to the stand-by mode (central diagram in FIG. 3).

In the stand-by mode (central diagram in FIG. 3), the select lever is selected to another running range, the lamp 15 blinks in the lighting pattern A2, and then the electronic control portion 4 proceeds to the learning mode. These processes are repeated.

When the learning has been done to all running ranges, the electronic control portion 4 controls the lamp 15 to blink in the lighting pattern A3 so as to notice the operator that the all learnings have been finished. Then, the operator finishes the learning control by, for example, stopping the engine.

In the stand-by mode (central diagram in FIG. 3), when the learning should be stopped because, for example the vehicle moves (vehicle speed≠0), the electronic control portion 4 controls the lamp 15 to blink in the lighting pattern A4 so as to notice the operator that the learning process should be executed from the beginning. In this case, the operator repeats the first operation after finishing the learning control by, for example, stopping the engine.

In the present embodiment, because the determinations are executed depending on the guard conditions while the learning control has been executed, the turbine rotation can be avoided from being continuing in stall state, which is unnecessary. In such case, the electronic control portion 4 immediately proceeds to the stand-by mode and executes the learning of the hydraulic pressure characteristic value repeatedly. Thus, even when a learning of a certain running range has not been finished correctly because of, for example, the wrong operation by the operator while the learning has been executed, there is no need to start all over again, and only the learning of the certain running range, which is not finished correctly, can be executed again.

In the present embodiment, because the switching operation of the select lever to a predetermined range is not be considered as a condition for starting the learning operation (the second operation), and the operation of the OD switch is considered as a trigger, the operator can press the OD switch after confirming the lamp 15. Thus, the learning operation of each range can be randomly executed.

In this embodiment, by means of the lamp, which is controlled so as to be lighted, in the stand-by mode, the operator is notified whether or not the learning has been ready, and after the learning has started, the operator is notified that the learning controls has been started, and the results of the learning is notified to the operator. Thus, the operator can comprehend the circumstance on each steps of the learning process. Further, the learning in accordance with the particular running range has been finished, even when the vehicle shows that the automatic transmission has some problems, the lamp 15 is controlled so as to notice the operator. Thus, because a following operation method or the vehicle condition can be comprehended appropriately, a wrong operation can be prevented and the hydraulic pressure characteristic value setting can be performed smoothly and conveniently.

More preferably, the obtained learning value may be automatically reset (initialized) at a point when the control start condition is fulfilled (lighting pattern A2). In this circumstance, the reset operation is accurately executed. Specifically, before the hydraulic pressure characteristic value learning, when the ECU, which comprises the electronic control portion 4, is still used, however, some parts, which may have effects on the calculation of the hydraulic pressure characteristic value are changed, or when the AT is still used, however, the ECU is changed, diag information or the learned value are used properly.

The electronic control portion 4 may restore the number of the number of resetting the learning value. Such learning value resetting number can be used as effective information for analyzing a vehicle maintenance condition.

Next, an embodiment of the present invention will be explained in reference with the attached figures. FIG. 1 illustrates a schematic view which indicating an entire configuration of an automatic transmission 1 in this embodiment. According to FIG. 1, the automatic transmission 1 includes a transmission unit 2, the hydraulic pressure control portion 3 and the electronic control portion 4. The hydraulic pressure control portion 3 and the electronic control portion 4 comprise a controlling portion.

The transmission unit 2 is connected to the output shaft (not shown) of an engine so as to transmit rotations of the engine to the vehicle wheels. The transmission unit 2 includes a torque converter 10, which is connected to the output shaft of the engine, an input shaft 11, which is connected to a turbine 10a of the torque converter 10, an output shaft 12, which is connected to the vehicle wheel by means of a differential gear, the double pinion planetary gear G1 on the first column, and the single pinion planetary gears G2 and G3 on the second and third columns. The transmission unit 2 houses a first friction clutch C1, a second friction clutch C2, a third friction clutch C3, a the first friction brake B1 and a second friction brake B2; which serve as hydraulic-transmitting-type plural (five) friction engaging elements. By means of the hydraulic pressure control portion 3 and the electronic control portion 4, the transmission unit 2 achieves shift changes by selecting engagements or disengagements among the first friction clutch C1, the second friction clutch C2, the third friction clutch C3, the first friction brake B1 and the second friction brake B2. Each of the first friction clutch C1, the second friction clutch C2, the third friction clutch C3, the first friction brake B1 and the second friction brake B2 require high pressure so as to be engaged, and require low pressure so as to be disengaged.

The hydraulic pressure control portion 3 is controlled by the electronic control portion 4 so as to switch a hydraulic circuit inside of the transmission unit 2, and the hydraulic pressure control portion 3 selects the friction engaging elements (engagements and disengagements among the friction engaging elements) for supplying the hydraulic pressure so as to control the hydraulic pressure applied to the friction engaging elements.

The electronic control portion 4 includes a microcomputer, into which output values of various sensors are input. The electronic control portion 4 controls the hydraulic pressure control portion 3 based on the output values, and control the lamp 15, which is provided on the driver's seat, to blink. In this embodiment, the automatic transmission 1 includes a turbine rotation sensor 13 for detecting a turbine rotation number Nt of the input shaft 11 (the turbine 10a), a position sensor 14 for detecting a position of the selector lever (not shown), an engine rotation sensor 16 for detecting an engine rotation number Ne, and a throttle sensor 17 for detecting a throttle opening.

The electronic control portion 4 executes the learning control based on the detected values, and an example of the learning control will be explained below.

The electronic control portion 4 includes a setting program for executing the learning of the hydraulic pressure characteristic value. Such program is started by the aftermentioned first operation.

The lamp 15 includes an existing configuration such as a AT warning on a driver's seat or an over drive lamp. The lamp 15 may be replaced by a sound device such as a buzzer, a shift change indicator, which is disclosed in JP2002-178949A, or a speedometer.

FIG. 2 illustrates a diagram showing engaging or disengaging condition among the friction engaging elements of the automatic transmission 1 relative to the transmission shifts. According to FIG. 2, the automatic transmission 1 achieves one reverse traveling shift, neutral and six forward traveling shifts depending on combinations among the friction engaging elements. Specifically, the forward traveling shifts includes under drives, which consists of the first, second, third and fourth speeds, and over drives, which consists of the fifth speed and the sixth speed. For example, when each of the third friction clutch C3 and the second friction brake B2 is engaged, the rotation of the input shaft 11 is reversed and transmitted to the output shaft 12 so as to move the vehicle in a rear direction. Further, when only the second friction brake B2 is engaged, the transmission shift becomes neutral, and when each of the first friction clutch C1 and the second friction brake B2 is engaged, the transmission shift becomes the first speed. Further more, each of the first friction clutch C1 and the first friction brake B1 is engaged, the transmission shift becomes the second speed. In the same manner, when each of the first friction clutch C1 and the third friction clutch C3 is engaged, the transmission shift becomes the third speed; when each of the first friction clutch C1 and the second friction clutch C2 is engaged, the transmission shift becomes the fourth speed; when each of the second friction clutch C2 and the third friction clutch C3 is engaged, the transmission shift becomes the fifth speed, and when each of the second friction clutch C2 and the first friction brake B1 is engaged, the transmission shift becomes the sixth speed.

When the transmission shift is changed from the first speed to the second speed, the electronic control portion 4 controls the second friction brake B2 to be disengaged (released) by means of the hydraulic pressure control portion 3 and controls the first friction brake B1 to be engaged. In addition, when the transmission shift is changed from the second speed to the third speed, the electronic control portion 4 controls the first friction brake B1 to be disengaged (released), and controls the third friction clutch C3 to be engaged. Furthermore, when the transmission shift is changed from the third speed to the fourth speed, the electronic control portion 4 controls the third friction clutch C3 to be disengaged (released), and controls the second friction clutch C2 to be engaged. When the transmission shift is changed from the fourth speed to the fifth speed, the electronic control portion 4 controls the first friction clutch C1 to be disengaged (released), and controls the third friction clutch C3 to be engaged. When the transmission shift is changed from the fifth speed to the sixth speed, the electronic control portion 4 controls the third friction clutch C3 to be disengaged (released), and controls the first friction brake B1 to be engaged.

Next, a setting method of the hydraulic pressure characteristic value according to the present embodiment will be explained in reference with FIG. 3, which illustrates a transition in this embodiment.

(Normal Mode)

The normal mode is a mode when the vehicle is traveling. Before executing the learning of the hydraulic pressure characteristic value, following preparations need to be done. The operator certainly stops the vehicle, locks the wheels, and engages a parking brake. Further, before the learning operation is executed, the operator confirms that the oil level is within a predetermined range and turns off electric devices or Power Take Off instruments, such as an air conditioner or head lights. Then the operator starts the engine of the vehicle, and warms up the engine for five minutes at an idling rotation number. It is preferable that the shift is moved, for example from N to D, or from N to R, several times (from three to five times).

(Learning Stand-By Mode)

To start the program for setting the hydraulic pressure characteristic value, which is housed in the electronic control portion 4 so as to proceed to the stand-by mode, the operator executes the first operation. The first operation includes three steps. First, a predetermined Diag Terminal is shorted or opened, second, the brake is engaged, and finally, the shift is changed three times from D to fourth speed within ten seconds.

The first operation is executed, the electronic control portion 4 determines whether or the following control start condition relative to the first operation is fulfilled: (1) Diag Terminal is short or released, (2) the output shaft rotation is zero, foot brake signal is turned on, and the engine rotation number Ne is equal to or more than 500 rpm, (3) after the drive range is changed from D to third, it is determined that the drive range is changed from D to third more than three times within ten seconds. Then, the condition of the sensors for detecting the hydraulic temperature and the turbine rotation or the solenoid or the like which relates to another control, or the condition of PTO, which may have a bad influence, are confirmed. If there is no problem, the electronic control portion 4 proceeds to the stand-by mode, in which various fail controls of the normal mode are not executed Between the point when the stand-by mode is started and the point the learning control is started, when the hydraulic temperature is out of a predetermined range, the electronic control portion 4 controls the lamp 15 to blink in the lighting pattern A1 so as to notice the operator that further warming up is needed if the hydraulic temperature is low, or notice that the cooling down is needs if the hydraulic temperature is high. Further, when the engine rotation number is high because of DPF (Diesel Particulate Filter) or the like, there is a need to wait until the engine rotation number becomes the idling state.

Then, when the hydraulic temperature becomes within the predetermined range, the electronic control portion 4 controls the lamp 15 to rapidly blink in the lighting pattern A2 so as to notice the preparation.

(Learning Execution Mode)

The learning control is executed only when the operator executes the second operation, in which the OD switch is turned on. In this embodiment, the operation of the OD switch is considered as a trigger (the second operation); however, another switch provided at the driver's seat may be operated alternatively. Further, the shift may be moved from N to D, or from N to R as a trigger alternatively even if the learning process can be repeated without the ending operation (IF OFF) of the stand-by mode, which is explained later.

When the learning control starts, the electronic control portion 4 controls the lamp 15 to blink rapidly in the lighting pattern B1', operates the accelerator within a predetermined time period, and promotes the engine rotation number to be stabilized at a predetermined rotation number. When the engine rotation number fulfills a regulated condition (e.g. stabilized for a predetermined time between 1000 rpm to 1500 rpm), the electronic control portion 4 controls the lamp 15 to blink slowly (in the lighting pattern B1).

Along with the control of the lamp 15, the electronic control portion 4 cancels the fail-safe function, which relates to a normal transmitting control so as to comprise a hydraulic circuit for the learning by means of the hydraulic pressure control portion 3

While the R range is selected, the electronic control portion 4 precedently engages the second friction brake B2 by means of the hydraulic pressure control portion 3, and then engages the third friction clutch C3 by means of the hydraulic pressure control portion 3. At this point, an input side of the third friction clutch C3 is engaged to a fixed output side so as to reduce a rotation number, specifically, the turbine rotation number Nt. Thus, based on the relationship between the controlling hydraulic pressure, which is used for engaging the second friction brake B2 and the third friction clutch C3, and the turbine rotation number Nt, the hydraulic pressure characteristic value when the engagement of the third friction clutch C3 is started can be obtained the third friction clutch C3. The learning controls of the pre-charge maximum time and the stand-by pressure will be explained below, however, any control can be executed first. Further, the learning result of one learning control, which is executed first, can be compared to a standard value or the like so as to be used for calculating the hydraulic pressure characteristic value of the other learning control.

(Learning Pre-Charge Maximum Time)

Figure 4:
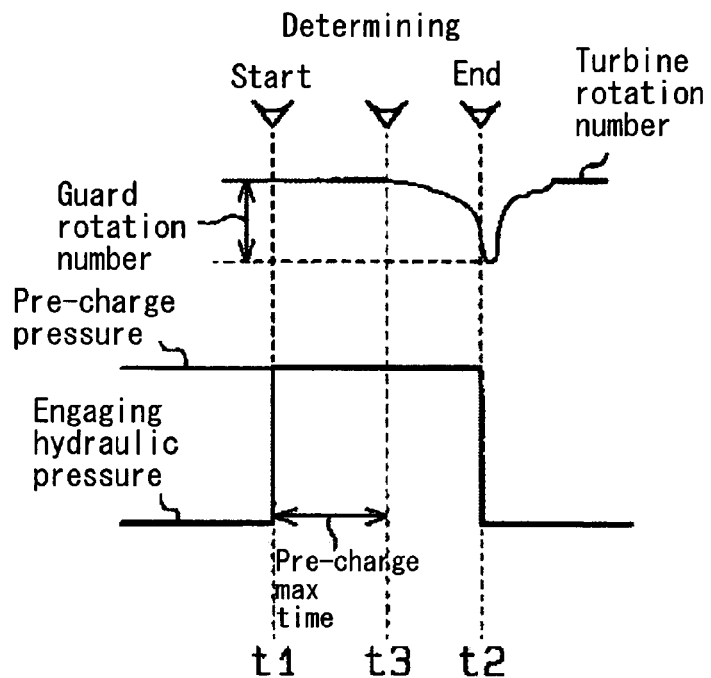
FIG. 4 illustrates a graph for explaining an outline of a learning of a pre-charge maximum time according to the present invention.

FIG. 4 illustrates a diagram for explaining the over view of the earning process of the pre-charge maximum time. According to FIG. 4, the electronic control portion 4 outputs a driving signal to the hydraulic pressure control portion 3. The driving signal corresponds to a predetermined pre-charge pressure of the friction engaging element, which is selected at time t1 (e.g. the third friction clutch C3 when R range is selected). The signal has continues to be output. As the hydraulic oil is filled, and the hydraulic pressure has been raised, the aforementioned friction engaging element becomes in an engaging state, the condition of the torque converter 10 is changed to a stall state, and the turbine rotation number Nt is decreased. The electronic control portion 4 controls the turbine rotation sensor 13 to monitor the decline of the turbine rotation number Nt and maintain the output of the driving signal until the determination has been done or the range of the decline of the turbine rotation number Nt exceeds a predetermined guard rotation number (until t2 in FIG. 4).

The electronic control portion 4 calculates a time when the movement of the turbine rotation number Nt fulfills a predetermined learning condition (when the determination is done). Specifically, the electronic control portion 4 calculates the engagement starting time□3 of the friction engaging element. A differential between a hydraulic control starting time t1 at the pre-charge pressure and an engagement starting time t3 at the pre-charge pressure is set as a pre-charge maximum time Tmax. After that, the pre-charge maximum time Tmax is used when the hydraulic oil is rapidly applied to the friction engaging element at the initial stage of the hydraulic pressure application.

The above process is a learning method of the pre-charge maximum time in a normal condition. When an environment is not set for the learning process, the electronic control portion 4 estimates the pre-charge maximum time. First, the electronic control portion 4 confirms whether or not a pre-charge estimating condition has been fulfilled based on the input value from the engine rotation sensor 16. If the pre-charge estimating condition has been fulfilled, the electronic control portion 4 controls the lamp 15 to blink slowly (the lighting pattern B1), and executes an estimating process of the pre-charge time, which is explained below, instead of the learning process of the pre-charge maximum time.

(Pre-Charge Estimating Condition 1)

A. The engine rotation number Ne is maintained within a predetermined range for a predetermined time period.

B. After the condition A is fulfilled, the engine rotation number Ne continuously exceeds a predetermined threshold value (engine rotation number Ne>predetermined threshold value). For example, during the learning control, the accelerator is operated so as to stabilize the engine rotation number to be within a range from 1000 rpm to 1500 rpm for a predetermined time period. However, after the engine rotation number is maintained within a range from 1000 rpm to 1500 rpm for a predetermined time period, if the accelerator has been released, the engine rotation number Ne is reduced to be less than 1000 rpm. In this circumstance, the pre-charge estimating condition is fulfilled.

(Pre-Charge Maximum Time Estimation)

First, the electronic control portion 4 outputs a driving signal by means of the hydraulic pressure control portion 3 so as to control the hydraulic pressure of the friction engaging element related to the selected running range to be a temporary pre-charge pressure Pi for estimation, and maintains the hydraulic pressure. As the hydraulic oil is applied to the friction engaging element, and the hydraulic pressure raises, the friction engaging element becomes in engaging state, the torque converter 10 is changed to the stall state, and the turbine rotation number Nt is decreased. The electronic control portion 4 monitors the decline of the turbine rotation number Nt in the same manner as the learning process of the normal pre-charge maximum time, which is explained above, and continues to output the driving signal until the determination is done or until the decline value of the turbine rotation number Nt exceeds a predetermined guard rotation number. The electronic control portion 4 calculates a time when the movement of the turbine rotation number Nt fulfills a predetermined learning condition (when the determination is done). Specifically, the electronic control portion 4 calculates the engagement starting time of the friction engaging element. A differential between a hydraulic control starting time at the pre-charge pressure and an engagement starting time at the pre-charge pressure is set as a pre-charge time.

Then, the electronic control portion 4 calculates an actual pre-charge maximum time tr, which can be obtained at the actual pre-charge pressure Pr by using a following formula to execute the learning. "α" in the formula means a adjusting coefficient for adjusting the effect of a line pressure while the vehicle is in an idling state.

$$tr = \alpha \cdot \sqrt{\frac{Pi}{Pr}} \cdot ti$$

The pre-charge maximum time tr, calculated by using the above formula, approximately corresponds to the pre-charge maximum time, which must have been obtained if the pre-charge estimating condition 1 has not been fulfilled. For example, if the correction coefficient α□0.95, Pr□800□Pa, Pi □450□Pa, and ti□161 (msec), tr becomes 114 (msec) based on the above formula (tr□0□95×(450□800)1□2× 161 (msec)).

(Stand-By Pressure Learning)

Figure 5:
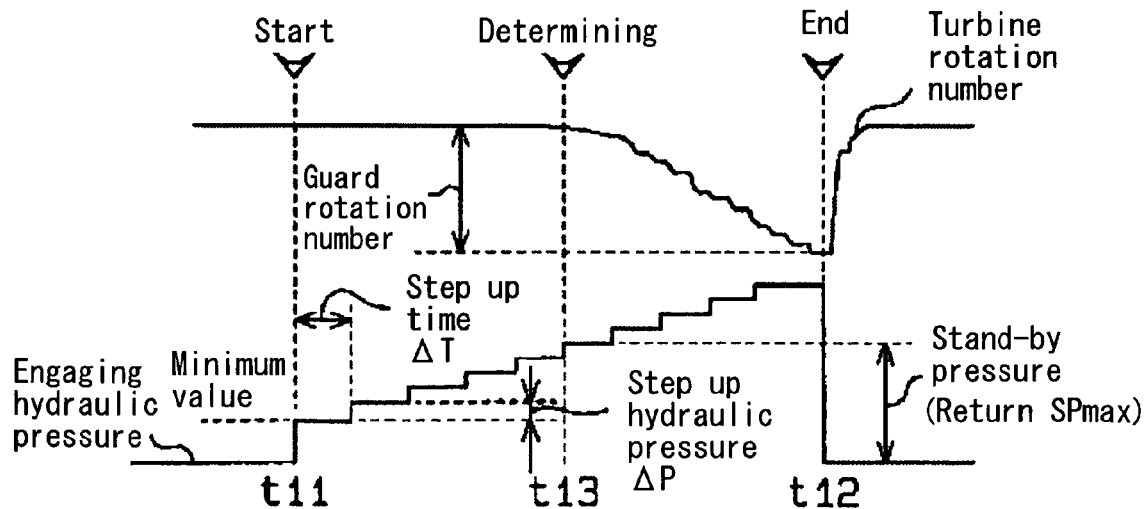
FIG. 5 illustrates a graph for explaining an outline of a learning of a stand-by pressure according to the present invention.

FIG. 5 illustrates a figure which explains a brief overview of the learning of the stand-by pressure. According to FIG. 5, the electronic control portion 4 outputs a driving signal to the hydraulic pressure control portion 3 so as to gradually increase the hydraulic pressure applied to the friction engaging element, which corresponds to the selected running range (e.g. apply to the third friction clutch C3 when the R range is selected), at time t11 with respect to every predetermined step-up time Δ□. As the hydraulic oil is applied to the friction engaging element, and the hydraulic pressure has been raised, the friction engaging element is gradually changed to the engaged state, the torque converter 10 is changed to the stall state after the applied pressure exceeds a predetermined pressure (the stand-by pressure), and then the turbine rotation number Nt is decreased. The electronic control portion 4 monitors the decline of the turbine rotation number Nt by means of the turbine rotation sensor 13, and maintains the output of the driving signal until the determination has been done or the range of the decline of the turbine rotation number Nt exceeds a predetermined guard rotation number (until t12 in FIG. 5).

The electronic control portion 4 calculates a time when the variation in the turbine rotation number Nt fulfills a predetermined learning condition (determination time), specifically the engagement starting time t13 of the friction engaging element. The hydraulic pressure of the friction engaging element, which equivalents to the driving signal at the engagement starting time t13, is learned as a stand-by pressure Pmax. The stand-by pressure Pmax is used for maintaining the friction engaging element to be in a stand-by state before the friction engaging element before is engaged.

(Guard Control Considering Dispersion by an Operator)

Figure 6:
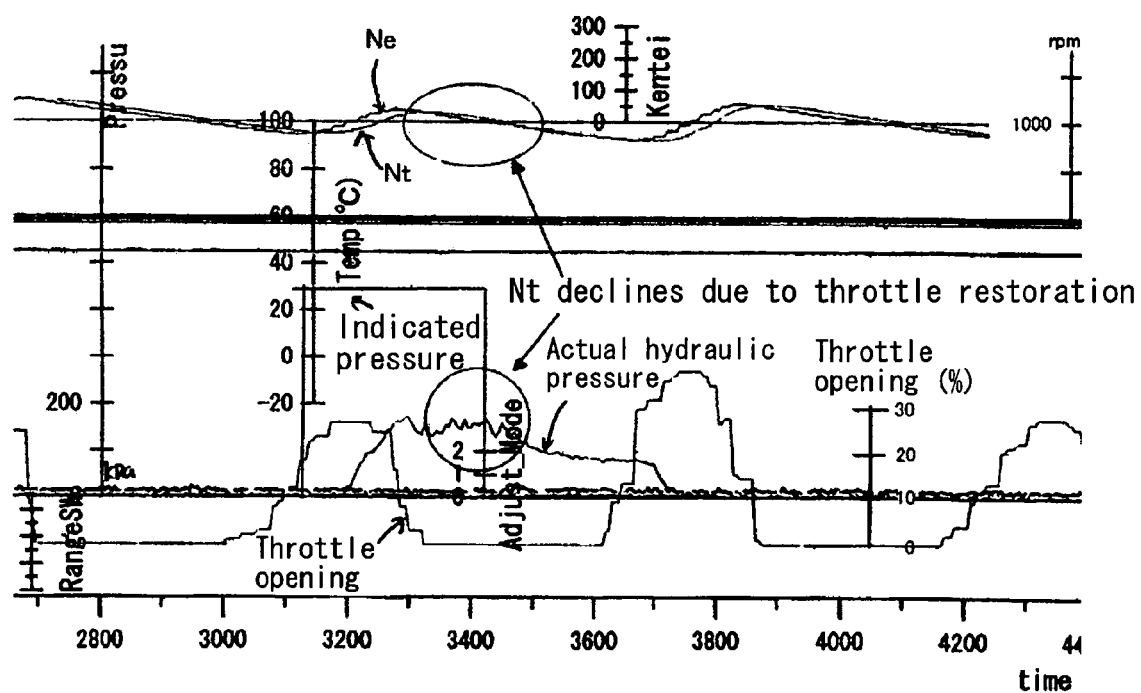
FIG. 6 illustrates a graph for explaining a relationship between the learning of the pre-charge maximum time and the present invention.

FIG. 6 illustrates a diagram for explaining a circumstance in which the pre-charge maximum time is executed by operating the accelerator no randomly and periodically. According to FIG. 6, the accelerator is operated while the pre-charge maximum time has been learned, the throttle opening and the engine rotation number Ne subsequently goes up and down, in a while, the turbine rotation number Nt goes up and down. Learning process of the pre-charge maximum time is executed depending on only a change of the turbine rotation number Nt as mentioned above. However, when the turbine rotation number Nt goes up and down due to the operator's habit or purposeful behavior, it is incorrectly detected that the turbine rotation number Nt s decreased because the torque converter 10 is changed to be in a stall state, and the pre-charge maximum time may be mismatched from the actual time.

While the learning control is executed, the electronic control portion 4 receives an input value from the turbine rotation sensor 13, the engine rotation sensor 16 and the throttle sensor 17 at predetermined intervals, confirms whether or not the following guard conditions are fulfilled. When the guard condition is fulfilled, the electronic control portion 4 controls the lamp 15 to be lighted (the lighting pattern B2) so as to notice the operator that the learning operation needs to be repeated. Each guard condition will be explained below in reference with FIG. 6.

(Guard Condition 1) Turbine rotation number Nt □ Nt_i*k

In this formula, Nt_i is the turbine rotation number, which is in an idling state, and k is a guard ratio. For example, if Nt_i□600 rpm and k□1.25, this guard condition is fulfilled when the turbine rotation number Nt raise at 150 rpm from Nt_i. According to FIG. 6, the electronic control portion 4 may finish the learning control and proceeds to the stand-by mode at a peak point of the cyclic variation in the turbine rotation number Nt, in which the turbine rotation number Nt is equal to or more than the predetermined value Nt_i*k. Further, the guard condition may be fulfilled alternatively only when learning control has maintained for a predetermined time period (e.g. 50 ms).

(Guard Condition 2)

The turbine rotation number Nt exceeds the engine rotation number Ne at predetermined number of times continuously. For example, based on Nt and Ne, which are received by the electronic control portion 4 from the turbine rotation sensor 13 and the engine rotation sensor 16 at 10 ms interval, exceeds, when the Nt exceeds Ne at predetermined number of times n (e.g. n=5), this guard condition is fulfilled. According to FIG. 6, while the turbine rotation number Nt exceeds the engine rotation number Ne, when above phenomenon is seen a predetermined number of time, the electronic control portion 4 may finish the learning control and proceeds to the stand-by mode. The predetermined number n is determined with respect to each vehicle depending on an engine performance thereof.

(Guard Condition 3)

Input value from the throttle sensor 17 occurs equal to or more than a predetermined numbers, which is set with respect to each the throttle opening. For example, when the throttle opening, which are received from throttle sensor 17 at 10 ms intervals, becomes equal to or more than 10% and equal to and less than 20%, and the throttle opening is received continuously ten times (=100 ms), or becomes equal to or more than 20% and equal to and less than 30%, and the throttle opening is received continuously five times (=50 ms), or becomes equal to or more than 30% just one time, the guard condition is fulfilled. According to FIG. 6, at a point where the throttle opening raises so as to form a bell-shaped form, the electronic control portion 4 ca certainly finished the learning control and proceeds to the stand-by mode. The above predetermined values are determined in consideration if the sensitivity of the throttle sensor 17 or behavior for operating the accelerator by the operator. Quantity of the accelerator opening may be increased.

Each the guard condition is not fulfilled, the learning of each the hydraulic pressure characteristic value is normally finished, the electronic control portion 4 memorizes and maintains the range at which the learning is finished, and then the electronic control portion 4 controls the lamp 15 to be turned off so as to notice the operator that the learning has been finished. However, when the learning is abnormally finished or the learning result beyond a standard value because of some problem (the operator interrupts the learning, or the automatic transmission has some problems) the electronic control portion 4 controls the lamp 15 to be lighted (the lighting pattern B2) so as to inform the operator that the learning should be repeated, or a check out should be done.

When the learning control of the hydraulic pressure characteristic value has been finished, the electronic control portion 4 returns to the stand-by mode regardless of the result the learning result is succeeded or not. Because the electronic control portion 4 has already been in the stand-by mode, when the learning process is repeated, the operator starts the second operation (OD switch OFF→ON) while the brake is stepped. Another problem is possible if the learning has correctly finished even when the learning operation is repeated a number of times, however, the running range learning can be kept on.

In this circumstance, when the learning of the hydraulic pressure characteristic value at each of the running ranges has been finished, the electronic control portion 4 repeatedly controls the lamp 15 to be lighted two seconds and to be turned off one second (the lighting pattern A3) so as to notice the operator that a predetermined control finishing operation such as an ignition OFF (IF OFF) operation should be executed. When the operator executes the control finishing operation, the electronic control portion 4 finishes a program for the learning and returns to the normal mode.

In this embodiment, the electronic control portion 4 determines the present state during the learning control, avoid the turbine rotation from being maintained in the unnecessary stall state, or considers an alternative step. In such case, the electronic control portion 4 rapidly proceeds to the stand-by mode. In this case, the electronic control portion 4 can rapidly proceeds to the stand-by mode so as to repeat the learning of the hydraulic pressure characteristic value. Thus, even when the learning of the running range has been properly finished because of the wrong operation or another causes, the learning needs not to be executed from the beginning, and only the learning relative to the particular range, in which the learning has not been finished properly, needs to be done.

In this embodiment, in consideration of load due to the repeated learning, the engine rotation number Ne is maintained for a predetermined time period at a predetermined range, and when the pre-charge estimating condition 1, which is fulfilled when the accelerator is returned, and the engine rotation number Ne becomes below a predetermined rotation number, is fulfilled, an assessed value of the pre-charge time is calculated. However, the guard condition may be provided alternatively depending on the speed of the learning operation or the quality requirement from the car dealer.

For example, during the learning control, it is required that the accelerator is operated so as to stabilize the engine rotation number between 1000 rpm and 1500 rpm, however, when the accelerator is returned, and the engine rotation number Ne becomes below 100 rpm, the electronic control portion 4 may determine that the guard condition is fulfilled, and may controls the lamp 15 to be lighted (lighting pattern B2) so as to notice the operator that the learning controls needs to be repeated after the engine rotation number is maintained for a predetermined time period at a predetermined range.

In this embodiment, only the turbine rotation number is used for learning the hydraulic pressure characteristic value, however, another methods disclosed, for example in JP2003-081939A or JP2003-081967, which is filed prior to this application by the applicant, may be used alternatively. In these methods, the hydraulic pressure characteristic value is obtained by calculating the differential between the engine rotation number and the turbine rotation number.

Further, in this embodiment, the learning method is explained in reference to the automatic transmission, which learns the pre-charge maximum time and the stand-by pressure as the hydraulic pressure characteristic value; however, this learning method may also be used for another hydraulic pressure characteristic value for controlling the clutch, which is separately determined with respect to each automatic transmission.

Second Embodiment

A guard method for setting the hydraulic pressure characteristic value will be explained below as a second embodiment. The electronic control portion 4 houses a setting program, which execute the learning of the hydraulic pressure characteristic value, and when the setting program starts, the hydraulic pressure characteristic value is set. Switching to a predetermined test mode starts the setting program. When the setting program starts, a fail-safe function, which relates to the normal transmission control, is canceled, and the electronic control portion 4 configures a required hydraulic circuit for executing the learning of the hydraulic pressure characteristic value by means of the hydraulic pressure control portion 3. In the embodiment 2, the pre-charge maximum time (referring to FIG. 4) and a hydraulic pressure (stand-by pressure; referring to FIG. 5) are set as the hydraulic pressure characteristic values.

The pre-charge maximum time is a time period, in which increased hydraulic oil is rapidly applied to the friction engaging element during the initial state of the hydraulic pressure application process, and the stand-by pressure means a hydraulic pressure for maintaining the friction engaging element at a point before friction engaging element stars engagement. Further, when guard conditions (1) to (7), which are explained below, are fulfilled, the setting program notice the operator by means of a lamp or the like that the determination ends in failure, are fulfilled, and then the setting program sets electromagnetic valves (linear solenoid, control valve, shift valve or the like) as a initial settings (disengagement) and stops outputting the driving signal so as to end the test immediately.

(1) Guard by Turbine Rotation Number (Nt Guard)

When the hydraulic oil is rapidly applied to the friction engaging element in the pre-charge maximum time test, the torque converter 10 is changed to a stall state while the friction engaging element becomes in an engaged state, and the turbine rotation number Nt is decreased. Further, when the hydraulic pressure of the friction engaging element is increased so as to exceed a predetermined hydraulic pressure in the stand-by pressure test, the torque converter is changed to the stall state while the friction engaging element becomes in an engaged state, and the turbine rotation number is decreased. The electronic control portion 4 monitors the turbine rotation number Nt by means of the turbine rotation sensor 13, and in the pre-charge maximum time test or the stand-by pressure test, the electronic control portion 4 stops outputting the driving signal when a range of the decline of the detected turbine rotation number Nt exceeds a predetermined guard rotation number. For example, while the guard rotation number (rpm) equals to the turbine rotation number (rpm) multiplied by the guard ratio in the start time, the electronic control portion 4 stops outputting the driving signal when the guard ratio under an idling state exceeds 0.5 in the pre-charge maximum time test, or when the guard ratio under the idling state exceeds 0.75 in the stand-by pressure test. In addition the electronic control portion 4 stops outputting the driving signal when the guard ratio while the engine rotates (the engine rotates faster than the idling state) exceeds 0.15 in the pre-charge maximum time test.

(2) Guard by Timer in the Pre-Charge Maximum Time Setting (Timer Guard)

A guard is provided when the test has not been finished because the determination is has not been done even when a predetermined time has been past in the pre-charge maximum time test. For example, if one second passed after the test starts, the electronic control portion 4 stops outputting the driving signal. This phenomenon happens because of following reasons; (i) the number of disc is few due to an inappropriate assembling, (ii) the rotation number of the turbine is not detected properly due to malfunction of the turbine rotation sensor 13, (iii) the hydraulic pressure is not applied to the friction engaging element due to malfunction of an electromagnetic valve or the like, which is controlled by the hydraulic pressure control portion 3, (iv) the hydraulic oil path extends to the friction engaging element is jammed by foreign objects or temporally stopped, (v) an O-ring of the clutch or the brake piston is damaged, and clutch or the brake piston is stuck or malfunctioned.

(3) Guard by the Indicated Hydraulic Pressure in the Stand-by Pressure Setting (Hydraulic Pressure Guard)

Figure 9:
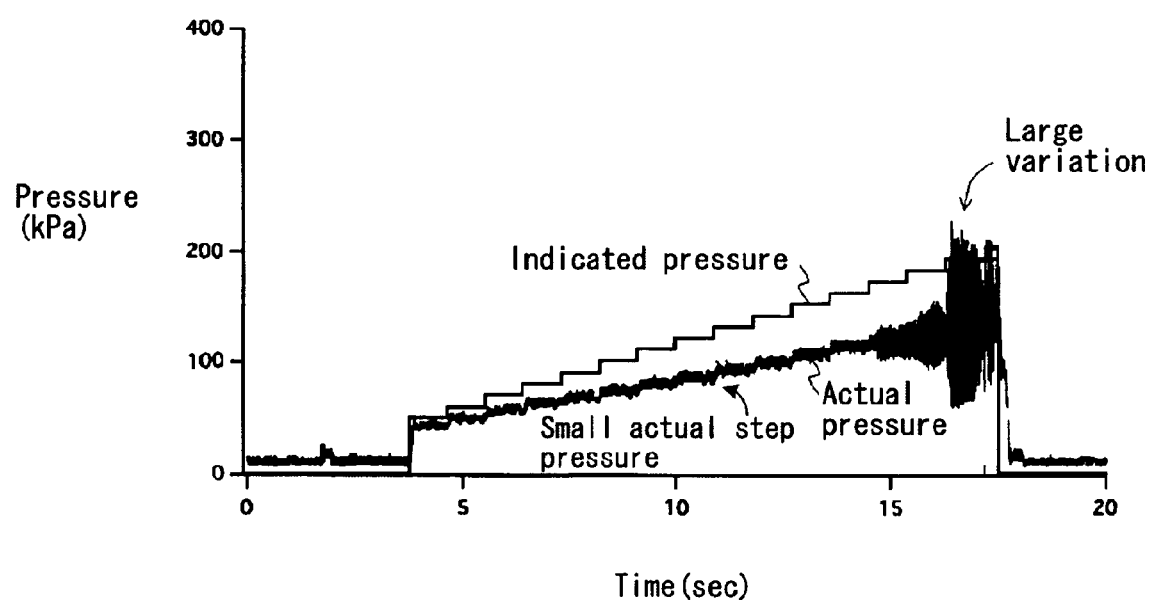
FIG. 9 illustrates a graph which indicating pressures when there are differences between pressure values and indicating pressure values.

A guard is provided when the test has not been finished because the determination is has not been done even when a hydraulic pressure exceeds a predetermined hydraulic pressure (indicated hydraulic pressure) in the stand-by pressure test. For example, if the indicated hydraulic pressure is equal to or more than 350 kpa, the electronic control portion 4 stops outputting the driving signal. This phenomenon happens because of following reasons; (i) the number of disc is few due to an inappropriate assembling, (ii) the rotation number of the turbine is not detected properly due to malfunction of the turbine rotation sensor 13, (iii) the hydraulic pressure is not applied to the friction engaging element due to malfunction of an electromagnetic valve or the like, which is controlled by the hydraulic pressure control portion 3, (iv) the hydraulic oil path extends to the friction engaging element is jammed by foreign objects or temporally stopped, (vi) the determination is not finished because the hydraulic pressure disperses (referrers to FIG. 9), (vii) the actual current of the linear solenoid-pressure gradient (actual I-P gradient) is below the standard, and the actual step pressure is below the indicated step pressure, and the turbine rotation number declines slowly so as to be smaller than the threshold (FIG. 7), (viii) a control valve can not move smoothly, and the actual pressure is lower than the indicated pressure (the control valve is stuck, or the orifice is clogged.

(4) Guard by the Engine Rotation Number (Ne Guard)

When the engine rotation number is equal to or more than a predetermined rotation number, a guard is provided for preventing a wrong determination or low accuracy. If accelerator is pressed, it is preferable that the engine rotation number is monitored when the engine rotation number becomes stable. For example, when the engine rotation number becomes equal to or more than 1500 rpm, the driving signal is stopped because when the operator foots on the accelerator by chance, and the accelerator is not maintained at a pressed state, the engine control is started by the another control of the vehicle side.

(5) Guard by a Foot Brake Switch (Brake Guard)

During the test, the operator releases the brake pedal that is used for stopping the rotation of the output shaft, because an excessive hydraulic pressure is applied during, especially the pre-charge maximum time test, the output shaft rotates. For ensuring the accuracy and safety, guards are provided only in a period from the start to the end of the pre-charge maximum time setting of each of the engaging element, and a period from start to the end of the stand-by pressure setting of each of the friction engaging element. For example, when the brake pedal is released, the output of the driving signal is stopped.

(6) Guard by Range Switching (Range Guard)

During the test, the operator accidentally switches the current range to another range, a guard is provided because a gear train state for testing the selected friction engaging element cannot be maintained, the test communicates nothing and furthermore, the mechanical damage may be happened. For example, when the selector lever switched from D range to N range, the drive signal is stopped.

(7) Upper and Lower Guard Depending on the Hydraulic Temperature (The Hydraulic Temperature Guard)

Figure 10A:
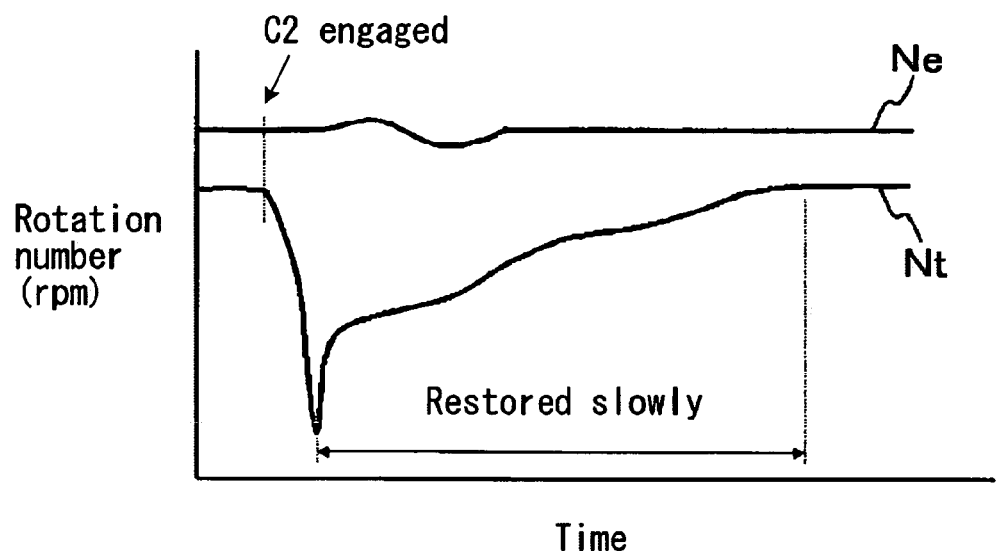
FIG. 10A illustrates a graph which indicating effects of viscosity of the hydraulic oil on the turbine rotation number under a low temperature when the turbine rotation is restored slowly.
Figure 10B:
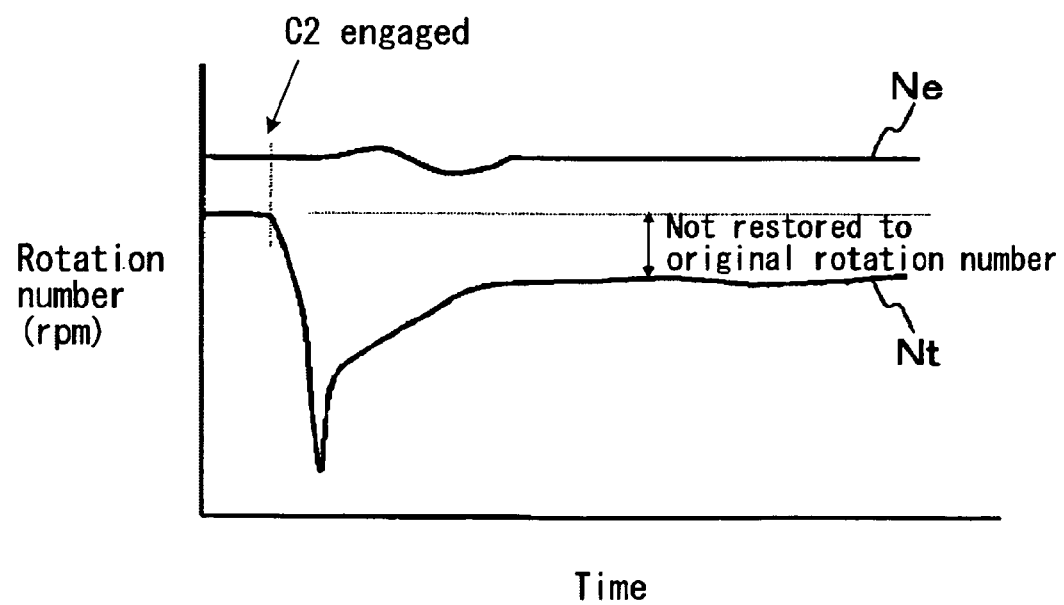
FIG. 10B illustrates a graph which indicating effects of viscosity of the hydraulic oil on the turbine rotation number under a low temperature when the turbine rotation is not restored to its original value.

The automatic transmission 1 starts slowly under a low temperature because of the viscosity of the hydraulic oil in comparison with the circumstance under a normal temperature, and even when the dispersion of the pre-charge maximum time is determined properly, it becomes a problem when the pre-charge maximum time is used for the transmission control because of the piston malfunction caused by slide or resistance of the o-ring or the like. Thus, a temperature range needs to be set in consideration of the effects from the viscosity of the hydraulic oil and the climate condition at a place where the vehicle is used. While the hydraulic pressure characteristic value setting, a guard is provided in consideration of that, in high temperature, the pre-charge maximum time is not dispersed due to the leaking, and in consideration of that, in low temperature, when the second friction clutch C2 of the gear train in FIG. 1 is engaged, the rotation difference of the gear train is large, and even when the turbine rotation number drops, it is hard that the turbine rotation number restores (FIG. 10A) or if the turbine rotation number restores, it is not identical (FIG. 10B), and the stand-by pressure is properly determined after the pre-charge maximum time setting. For example, when the hydraulic temperature t is not within 40□□□□90□, the driving signal is stopped.

Figure 7:
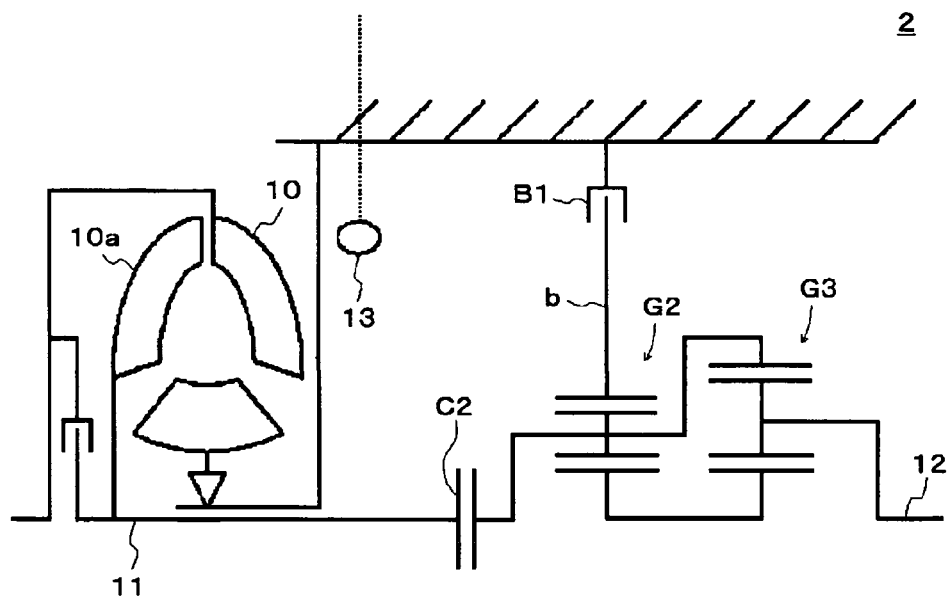
FIG. 7 illustrates a diagram which indicating a train state of the automatic transmission, wherein a second friction brake B2 is engaged.
Figure 8:
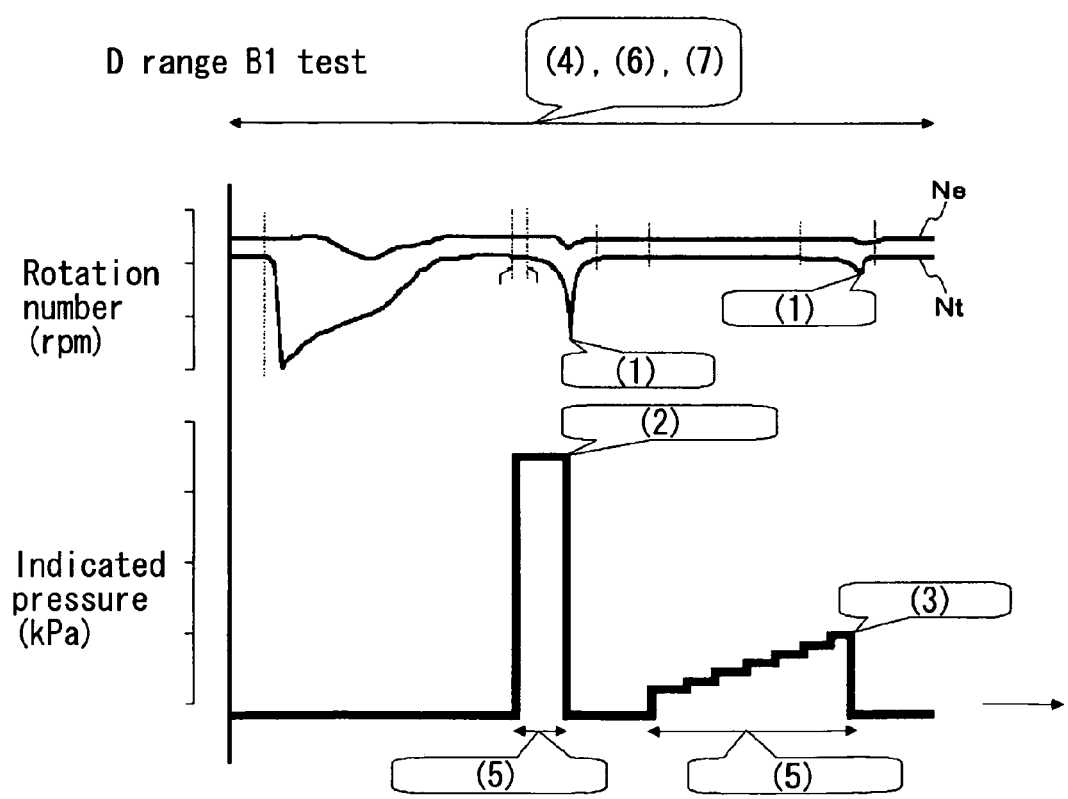
FIG. 8 illustrates a time chart which indicating guide setting timings of a guard method in a hydraulic pressure characteristic value setting.

The guard method when the hydraulic pressure characteristic value of the first friction brake B1 is set will be explained with reference to the attached figures. FIG. 7 illustrates a pattern diagram which indicates a train state when the second friction clutch C2 of the automatic transmission 1 according to the second embodiment is engaged. FIG. 8 illustrates a time chart which indicates a operational timing the guard method when the hydraulic pressure characteristic value according to the second embodiment is set.

First, while the electronic control portion 4 is switched to the test mode, the setting programs becomes a stand-by state when the vehicle is not traveling (the brake pedal is pressed, brake switch is turned on), the engine is rotated (idling state) and the running range is in N range.

In this circumstance, the running range is switched from N range to D range (Over Drive is still "OFF"), the electronic control portion 4 forms a hydraulic circuit by means of the hydraulic pressure control portion 3 so as to select the range to the fourth speed and precedently engages the second friction clutch C2.

When the running range is switched from N range to D range, following guard methods are executed. The electronic control portion 4 monitors whether or not the engine rotation number is equal to or more than a predetermined rotation number until the hydraulic pressure characteristic value of the first friction brake B1 is finished. When the engine rotation number becomes equal to or more than the predetermined number, the driving signal is stopped ((4) Ne guard). Further, until the hydraulic pressure characteristic value setting to the first friction brake B1 has been finished, the electronic control portion 4 monitors whether or not the drive range is switched from D range to N range. When the drive range is switched from D range to N range, the driving signal is stopped ((6) range guard). Furthermore, until the hydraulic pressure characteristic value setting to the first friction brake B1 has been finished, the electronic control portion 4 monitors whether or not the hydraulic temperature is within a predetermined temperature range. When the hydraulic temperature is out of the predetermined temperature range, the driving signal is stopped. ((7) hydraulic temperature guard)

Figure 3:
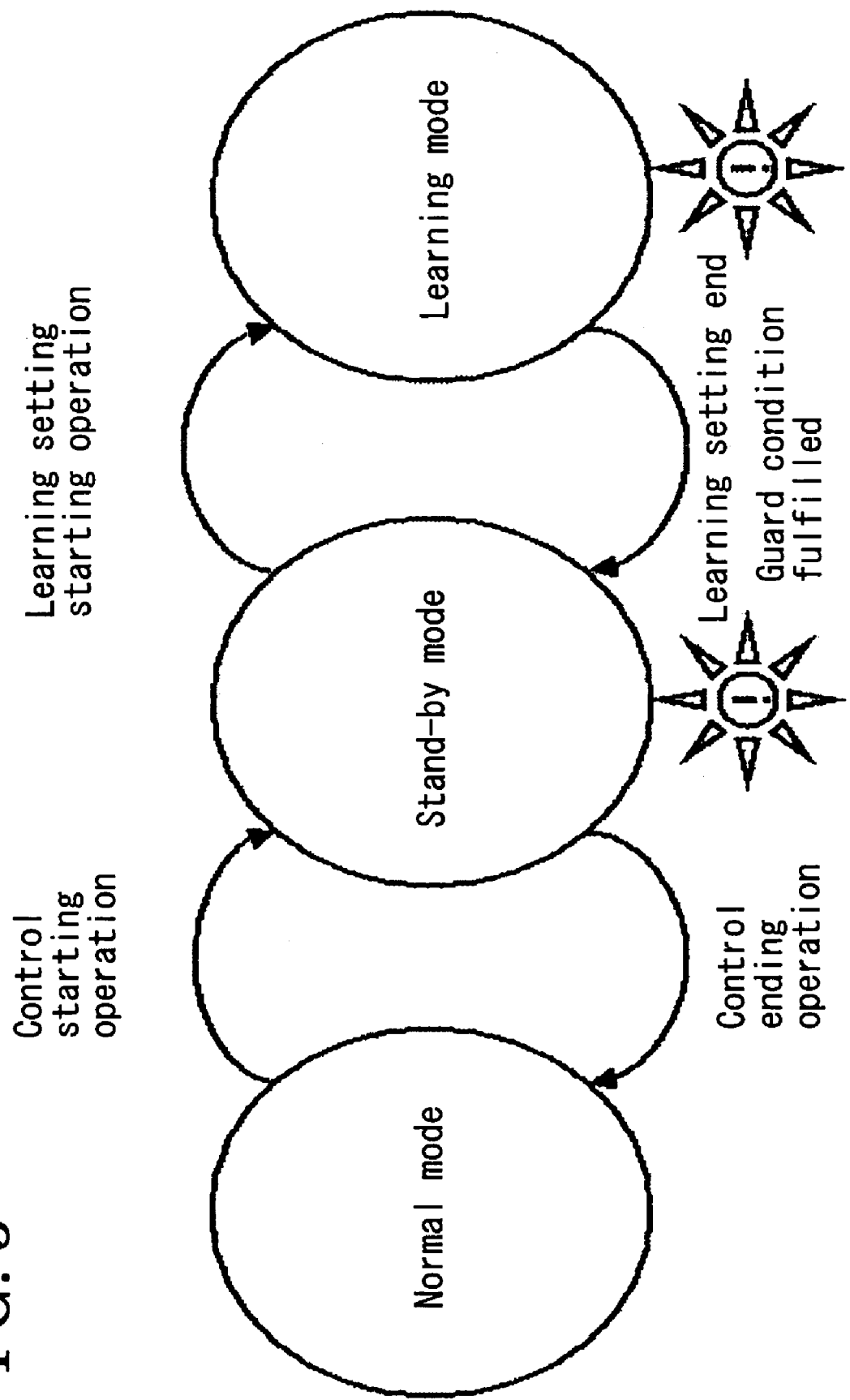
FIG. 3 illustrates a transition diagram which indicates actuations according to the present invention.

As shown in FIG. 3, when the vehicle is not traveling, the output shaft 12 is fixed by means of the wheels, and to the shaft b side of the first friction brake B1, rotation of the input shaft 11 (turbine 10a) is transmitted by means of the double pinion planetary gear G1 on the first column, and the single pinion planetary gears G2 and G3 on the second and third columns. Thus, the rotation number of the shaft b of the first friction brake B1 is calculated from $(1\square\rho 2\square\rho 2\square\rho 3)*Nt$, in which Nt means the turbine rotation number, $\rho 2$ means the speed ratio of the single pinion planetary gear G2 and $\rho 3$ means the speed ratio of the single pinion planetary gear of G3. On the other hand, the rotation number of the first friction brake B1 on the case side becomes zero.

In this circumstance, the electronic control portion 4 moves the first friction brake B1 to be engaged by means of the hydraulic pressure control portion 3, and then a shaft b of the first friction brake B1 engages with the fixed case side so as to decrease the number of rotation thereof, in other words, decrease the turbine rotation number Nt. Thus, the hydraulic pressure characteristic value of the first friction brake B1 can be obtained in accordance with a relationship between the controlling hydraulic pressure when the first friction brake B1 is engaged and the turbine rotation number Nt.

FIG. 4 illustrates a time chart indicating a setting configuration of the pre-charge maximum time in accordance with the first friction brake B1 of the automatic transmission 1 according to the second embodiment. The pre-charge maximum time is executed by means of the setting program. The electronic control portion 4 outputs a driving signal, which is in a stepped form, to the hydraulic pressure control portion 3. The driving signal corresponds to a predetermined pre-charge pressure of the first friction brake B1, which is selected at time t1. The signal has continued to be output, and then the hydraulic oil is applied to the first friction brake B1.

As the hydraulic oil is applied to the first friction brake B1, and the hydraulic pressure has been raised, the first friction brake B1 is gradually changed to the engaged state, the torque converter 10 is changed to the stall state and then the turbine rotation number Nt is decreased. At this point, the electronic control portion 4 monitors the decline of the turbine rotation number Nt by means of the turbine rotation sensor 13, and stops outputting the driving signal when the range of the decline of the turbine rotation number Nt detected at time t2 exceeds a predetermined guard rotation number ((1) Nt guard).

The electronic control portion 4 executes a predetermined analysis based on the variation in the turbine rotation number Nt between the time t1 and time t2 and calculates the start time at which the turbine rotation number Nt declines, in other words the engagement starting time t3 of the first friction brake B1. Then, the electronic control portion 4 executes the learning the pre-charge maximum time Tmax between the time t1 and t3 as a characteristic value. The pre-charge maximum time Tmax is referred at the initial period when the hydraulic oil is rapidly applied to the first friction brake B1.

While the pre-charge maximum time is set, the following guard methods are executed. The electronic control portion 4 obtains the time from the beginning when the pre-charge maximum time setting starts and stops outputting the driving signal when the time reaches a predetermined point ((2) timer guard). Further, the electronic control portion 4 monitors where or not the brake is released until the pre-charge maximum time setting of the first friction brake B1 is finished and stops outputting the driving signal when the electronic control portion 4 detects that the brake is released ((5) brake guard).

FIG. 5 illustrates a time chart indicating a setting configuration of the stand-by pressure in accordance with the first friction brake B1 of the automatic transmission 1 according to the second embodiment. The stand-by pressure is also executed by means of the setting program. The electronic control portion 4 outputs a driving signal to the hydraulic pressure control portion 3 so as to increase the hydraulic pressure in a predetermined step-up hydraulic pressure $\Delta P$ with respect to each the sep-up time $\Delta\square$, to the hydraulic pressure control portion 3, so that the hydraulic pressure. The driving signal corresponds to a predetermined pre-charge pressure of the first friction brake B1, which is selected at time t1. Then, the hydraulic oil is applied to the first friction brake B1 as time passes, and the hydraulic pressure is increased.

As the hydraulic pressure, which is applied to the first friction brake B1 increases so as to exceeds a predetermined pressure (the stand-by pressure), the first friction brake B1 moves so as to be engaged, and then the torque converter 10 becomes a stall state, and the turbine rotation number Nt is decreased. The electronic control portion 4 monitors the decline of the turbine rotation number Nt by means of the turbine rotation sensor 13 and stops outputting the driving signal when the range of the decline of the turbine rotation number Nt, which is detected at the time t12, exceeds the guard rotation number ((1) Nt guard)

The electronic control portion 4 executes a predetermined analysis based on the variation in the turbine rotation number Nt between the time t11 and time t12 and calculates the start time at which the turbine rotation number Nt declines, in other words the engagement starting time t13 of the first friction brake B1. Then, the electronic control portion 4 executes the learning the stand-by pressure Pmax at engagement starting time$\square$13 as a characteristic value. The stand-by pressure Pmax is referred at right before the first friction brake B1 engages.

In the stand-by pressure setting, following guard method will be executed. The electronic control portion 4 monitors whether or not the hydraulic pressure applied to the first friction brake B1 exceeds a predetermined pressure until the stand-by pressure setting is finished. If the hydraulic pressure applied to the first friction brake B1 exceeds a predetermined pressure, the electronic control portion 4 stops outputting the driving signal (referrer to (3) hydraulic pressure guard). Further, the electronic control portion 4 monitors whether or not the brake is released until the stand-by pressure setting for the first friction brake B1 is finished. If the brake is released, the electronic control portion 4 stops outputting the driving signal (referrer to (3) brake guard).

The guard method for the first friction brake B1 when the hydraulic pressure characteristic value is set, however, guard methods for the first friction clutch C1, the second friction clutch C2, the third friction clutch C3, the second friction brake B2 when the hydraulic pressure characteristic value (the pre-charge maximum time Tmax or the stand-by pressure Pmax) is set in the same manner Third Embodiment A method for setting the hydraulic pressure characteristic value according will be explained below as a third embodiment. In the third embodiment, the electronic control portion 4 confirms the hydraulic temperature and maintains the engine rotation number at a predetermined rotation number, and then the electronic control portion 4 outputs a driving signal of the selected friction engaging element, which corresponds to a predetermined pre-charge pressure, to the hydraulic pressure control portion 3 (shown in FIG. 4). In accordance with the driving signal, hydraulic oil is rapidly applied to the selected friction engaging element so as to move to be engaged rapidly.

As the hydraulic oil is applied to the engaging element, and the hydraulic pressure raises, the friction engaging element is moved to be engaged. Then, the torque converter 10 becomes a stall state, and the turbine rotation number Nt is decreased. The electronic control portion 4 monitors the decline of the turbine rotation number Nt by means of the turbine rotation sensor 13 and maintains outputting the driving signal until the determination is done or the range of the decline of the turbine rotation number Nt exceeds the guard rotation number (shown in FIG. 4).

Further, the electronic control portion 4 obtains a time at which movement the turbine rotation number Nt fulfills a predetermined learning condition by controlling the pre-charge maximum time by means of the learning control (t3 in FIG. 4), specifically, the electronic control portion 4 obtains the engagement starting time of the friction engaging element. Then, the pre-charge maximum time $\Box_0$ is obtained by calculating the differential between the hydraulic control starting time t1 and the engagement starting time t3 at the pre-charge pressure.

Further, when the friction engaging element needs to be corrected, the electronic control portion 4 executes the learning by obtaining a corrected pre-charge maximum time $\Box_1$ by substituting the above uncorrected pre-charge maximum time $\Box_0$ into the following formula so as to execute the learning. Then, the corrected pre-charge maximum time $\Box_1$ is used during a initial period of the hydraulic oil application, in which the hydraulic oil is rapidly applied to the specific friction engaging element.

$$T_1 = T_0 - \frac{(T_0 - a)^2}{b}$$

($\Box_0$-$\Box$)2$\Box\Box$ in the right side is for correcting the correcting value so as to become gradually larger in accordance with the uncorrected pre-charge maximum time $\Box_0$. The constant numbers "a" and "b" are set with respect to each friction engaging element in accordance with a standard lower limit value or a range of a permissible standard so as to modify the correcting value to become smaller when the uncorrected pre-charge maximum time $\Box_0$ is approximately below the standard, and so as to modify the correcting value to become larger when the uncorrected pre-charge maximum time $\Box_0$ is approximately above the standard.

Then, the electronic control portion 4 outputs a driving signal to the hydraulic pressure control portion 3 so as to gradually increase the hydraulic pressure applied to the selected engaging element with respect to a predetermined each step-up time $\Delta t$ (shown in FIG. 5). Thus, the hydraulic oil is applied in degree, and the selected friction engaging element is gradually moved so as to be engaged.

As the hydraulic oil is applied to the engaging element, and the hydraulic pressure raises, the friction engaging element is moved to be engaged. Then, the torque converter 10 becomes a stall state around a point where the hydraulic pressure exceeds a predetermined pressure (stand-by pressure), and the turbine rotation number Nt is decreased. The electronic control portion 4 monitors the decline of the turbine rotation number Nt by means of the turbine rotation sensor 13 and maintains outputting the driving signal until the determination is done or the range of the decline of the turbine rotation number Nt exceeds the guard rotation number (shown in FIG. 5).

Further, the electronic control portion 4 obtains a start time at which the decline movement of the turbine rotation number Nt exceeds a predetermined threshold (t13 in FIG. 5), specifically, the electronic control portion 4 obtains the engagement starting time of the friction engaging element. An uncorrected stand-by pressure $\Box 0$ is obtained in accordance with the hydraulic pressure of the selected friction engaging element, which corresponds to the driving signal at the engagement starting time.

Furthermore, when the friction engaging element needs to be corrected, the electronic control portion 4 executes the learning by obtaining a corrected stand-by pressure $P_1$ by substituting the above stand-by pressure $P_0$ into the following formula so as to execute the learning. Then, the corrected stand-by pressure $P_1$ is used right before the specific friction engaging element s engaged for maintaining it.

$$P_1 = P_0 - \frac{(P_0 - c)^2}{d}$$

($\Box 0$-$\Box$)2$\Box\Box$in the right side is for correcting the correcting value so as to become gradually larger in accordance with the uncorrected stand-by pressure $\Box 0$. The constant numbers "c" and "d" are set with respect to each friction engaging element in accordance with a standard lower limit value or a range of a permissible standard so as to modify the correcting value to become smaller when the uncorrected stand-by pressure $\Box_0$ is approximately below the standard, and so as to modify the correcting value to become larger when the uncorrected stand-by pressure $\Box_0$ is approximately above the standard.

In this circumstance, according to the present embodiment, the hydraulic pressure characteristic value can be modified or set so as to be safer (small transmission shock).

Next, an example of the present invention will be explained in reference with the attached figures. FIG. 1 illustrates a schematic view which indicating an entire configuration of an automatic transmission 1 in this example. According to FIG. 1, the automatic transmission 1 includes a transmission unit 2, the hydraulic pressure control portion 3 and the electronic control portion 4. The hydraulic pressure control portion 3 and the electronic control portion 4 comprise a controlling portion.

The transmission unit 2 is connected to the output shaft (not shown) of an engine so as to transmit rotations of the engine to the vehicle wheels. The transmission unit 2 includes a torque converter 10, which is connected to the output shaft of the engine, an input shaft 11, which is connected to a turbine 10a of the torque converter 10, an output shaft 12, which is connected to the vehicle wheel by means of a differential gear, the double pinion planetary gear G1 on the first column, and the single pinion planetary gears G2 and G3 on the second and third columns. The transmission unit 2 houses a first friction clutch C1, a second friction clutch C2, a third friction clutch C3, a the first friction brake B1 and a second friction brake B2; which serve as hydraulic-transmitting-type plural (five) friction engaging elements. By means of the hydraulic pressure control portion 3 and the electronic control portion 4, the transmission unit 2 achieves shift changes by selecting engagements or disengagements among the first friction clutch C1, the second friction clutch C2, the third friction clutch C3, the first friction brake B1 and the second friction brake B2. Each of the first friction clutch C1, the second friction clutch C2, the third friction clutch C3, the first friction brake B1 and the second friction brake B2 require high pressure so as to be engaged, and require low pressure so as to be disengaged.

The hydraulic pressure control portion 3 is controlled by the electronic control portion 4 so as to switch a hydraulic circuit inside of the transmission unit 2, and the hydraulic pressure control portion 3 selects the friction engaging elements (engagements and disengagements among the friction engaging elements ) for supplying the hydraulic pressure so as to control the hydraulic pressure applied to the friction engaging elements.

The electronic control portion 4 includes a microcomputer, into which output values of various sensors are input. The electronic control portion 4 controls the hydraulic pressure control portion 3 based on the output values, and control the lamp 15, which is provided on the driver's seat, to blink. In this example, the automatic transmission 1 includes a turbine rotation sensor 13 for detecting a turbine rotation number Nt of the input shaft 11 (the turbine 10a), a position sensor 14 for detecting a position of the selector lever (not shown), an engine rotation sensor 16 for detecting an engine rotation number Ne, and a throttle sensor 17 for detecting a throttle opening. The electronic control portion 4 executes the learning control based on the detected values, and an example of the learning control will be explained below.

The electronic control portion 4 memorize and maintain a correction table of the pre-charge maximum time and the stand-by pressure in its memory with respect to each friction engaging element. The following correction table shows corrections of the pre-charge maximum time of the first friction brake B1 of the automatic transmission 1, which needs to be corrected. In this table, a standard range (tolerance zone)±150 ms (standard center is Tc) is divided into six sections with respect to each 50 ms. Larger corrections are made in the upper sections.

TABLE 1

| Sections | Correction amount |
| --- | --- |
| A: −150 ms ≦ Tc < −100 ms | −50 ms |
| B: −100 ms ≦ Tc < −50 ms | −60 ms |
| C: −50 ms ≦ Tc < 0 ms | −70 ms |
| D: 0 ms ≦ Tc < 50 ms | −80 ms |
| E: 50 ms ≦ Tc < 100 ms | −90 ms |
| F: 100 ms ≦ Tc < 150 ms | −100 ms |

The following correction table shows corrections of the stand-by pressure of the first friction brake B1 of the automatic transmission 1, which needs to be corrected. In this table, a standard range (tolerance zone)±20 kPa (standard center is Pc) is divided into four sections with respect to each 10 kPa. Larger corrections are made in the upper sections.

TABLE 2

| Sections | Correction amount |
| --- | --- |
| A: −20 kPa ≦ Pc < −10 kPa | 0 kPa |
| B: −10 kPa ≦ Pc < 0 kPa | −5 kPa |
| C: 0 kPa ≦ Pc < 10 kPa | −10 kPa |
| D: 10 kPa ≦ Pc < 20 kPa | −15 kPa |

The electronic control portion 4 further houses a setting program for executing the learning of the hydraulic pressure characteristic value for setting the hydraulic pressure characteristic value, which is started by a predetermined operation.

FIG. 2 illustrates a diagram showing engaging or disengaging condition among the friction engaging elements of the automatic transmission 1 relative to the transmission shifts. According to FIG. 2, the automatic transmission 1 achieves one reverse traveling shift, neutral and six forward traveling shifts depending on combinations among the friction engaging elements. Specifically, the forward traveling shifts includes under drives, which consists of the first, second, third and fourth speeds, and over drives, which consists of the fifth speed and the sixth speed.

For example, when each of the third friction clutch C3 and the second friction brake B2 is engaged, the rotation of the input shaft 11 is reversed and transmitted to the output shaft 12 so as to move the vehicle in a rear direction. Further, when only the second friction brake B2 is engaged, the transmission shift becomes neutral, and when each of the first friction clutch C1 and the second friction brake B2 is engaged, the transmission shift becomes the first speed. Further more, each of the first friction clutch C1 and the first friction brake B1 is engaged, the transmission shift becomes the second speed. In the same manner, when each of the first friction clutch C1 and the third friction clutch C3 is engaged, the transmission shift becomes the third speed; when each of the first friction clutch C1 and the second friction clutch C2 is engaged, the transmission shift becomes the fourth speed; when each of the second friction clutch C2 and the third friction clutch C3 is engaged, the transmission shift becomes the fifth speed, and when each of the second friction clutch C2 and the first friction brake B1 is engaged, the transmission shift becomes the sixth speed.

When the transmission shift is changed from the first speed to the second speed, the electronic control portion 4 controls the second friction brake B2 to be disengaged (released) by means of the hydraulic pressure control portion 3 and controls the first friction brake B1 to be engaged. In addition, when the transmission shift is changed from the second speed to the third speed, the electronic control portion 4 controls the first friction brake B1 to be disengaged (released), and controls the third friction clutch C3 to be engaged. Furthermore, when the transmission shift is changed from the third speed to the fourth speed, the electronic control portion 4 controls the third friction clutch C3 to be disengaged (released), and controls the second friction clutch C2 to be engaged. When the transmission shift is changed from the fourth speed to the fifth speed, the electronic control portion 4 controls the first friction clutch C1 to be disengaged (released), and controls the third friction clutch C3 to be engaged. When the transmission shift is changed from the fifth speed to the sixth speed, the electronic control portion 4 controls the third friction clutch C3 to be disengaged (released), and controls the first friction brake B1 to be engaged.

A flow of the learning of the hydraulic pressure characteristic value of the automatic transmission 1 will be explained below taking a first friction brake as an example. First, in accordance with the predetermined operation by the operator, the electronic control portion 4 confirms that the vehicle is not traveling, the engine rotation number is in a idling state, and the hydraulic temperature, the sensor 13 for detecting the turbine rotation or the like and solenoid to be controlled are checked, and PTO, which may have bad effect is checked. If there is no problem, the electronic control portion 4 proceeds to a stand-by state. In this state, when the running range is switched from N range to D range by the operation of the selector lever, and further when a predetermined learning start trigger, such as a OD switch is operated, the electronic control portion 4 controls the second friction clutch C2 by means of the hydraulic pressure control portion 3 to be engaged precedently so as to form a hydraulic circuit for selecting more than fourth speed range (shown in FIG. 2).

In this circumstance, the electronic control portion 4 moves the first friction brake B1 to be engaged by means of the hydraulic pressure control portion 3, and then a shaft b of the first friction brake B1 engages with the fixed case side so as to decrease the number of rotation thereof, in other words, decrease the turbine rotation number Nt. Thus, the hydraulic pressure characteristic value of the first friction brake B1 can be obtained in accordance with a relationship between the controlling hydraulic pressure when the first friction brake B1 is engaged and the turbine rotation number Nt.

FIG. 4 illustrates a diagram for explaining the over view of the earning process of the pre-charge maximum time. According to FIG. 4, the electronic control portion 4 outputs a driving signal to the hydraulic pressure control portion 3. The driving signal corresponds to a predetermined pre-charge pressure of the first friction brake B1, which is selected at time t1. The signal has continued to be output. As the hydraulic oil is filled, and the hydraulic pressure has been raised, the first friction brake B1 becomes in an engaging state, the condition of the torque converter 10 is changed to a stall state, and the turbine rotation number Nt is decreased. The electronic control portion 4 controls the turbine rotation sensor 13 to monitor the decline of the turbine rotation number Nt and maintain the output of the driving signal until the determination has been done or the range of the decline of the turbine rotation number Nt exceeds a predetermined guard rotation number (until t2 in FIG. 4).

The electronic control portion 4 calculates a time when the movement of the turbine rotation number Nt fulfills a predetermined learning condition (when the determination is done). Specifically, the electronic control portion 4 calculates the engagement starting time □3 of the friction engaging element. A differential between a hydraulic control starting time t1 at the pre-charge pressure and an engagement starting time t3 at the pre-charge pressure is set as a pre-charge maximum time $T_0$.

Further, the electronic control portion 4 calculates the corrected pre-charge maximum time $T_1$ so as to execute the learning by decreasing a correcting value from the uncorrected pre-charge maximum time $T_0$. The correcting value is shown in a section of the above table 1, in which the uncorrected pre-charge maximum time $T_0$ exists. After that, corrected pre-charge maximum time $T_1$ is used when the hydraulic oil is rapidly applied to the friction engaging element at the initial stage of the hydraulic pressure application.

FIG. 5 illustrates a figure which explains a brief overview of the learning of the stand-by pressure. According to FIG. 5, the electronic control portion 4 outputs a driving signal to the hydraulic pressure control portion 3 so as to gradually increase the hydraulic pressure applied to the first friction brake B1 at a predetermined step pressure ΔP at time t11 with respect to every predetermined step-up time Δt. As the hydraulic oil is applied to the first friction brake B1, and the hydraulic pressure has been raised, the first friction brake B1 is gradually changed to the engaged state, the torque converter 10 is changed to the stall state after the applied pressure exceeds a predetermined pressure (the stand-by pressure), and then the turbine rotation number Nt is decreased. The electronic control portion 4 monitors the decline of the turbine rotation number Nt by means of the turbine rotation sensor 13, and maintains the output of the driving signal until the determination has been done or the range of the decline of the turbine rotation number Nt exceeds a predetermined guard rotation number (until t12 in FIG. 5).

The electronic control portion 4 calculates a time when the variation in the turbine rotation number Nt fulfills a predetermined learning condition (determination time), specifically the engagement starting time t13 of the first friction brake B1. The hydraulic pressure of the first friction brake B1, which equivalents to the driving signal at the engagement starting time t13, is learned as a uncorrected stand-by pressure $P_0$.

Further, the electronic control portion 4 calculates the corrected stand-by pressure $P_1$ so as to execute the learning by decreasing a correcting value from the uncorrected stand-by pressure $P_0$. The correcting value is shown in a section of the above table 2, in which the uncorrected stand-by pressure $P_0$ exists. After that, corrected stand-by pressure □1 is used so as to maintain the friction engaging element at a position right before the engagement.

Figure 11:
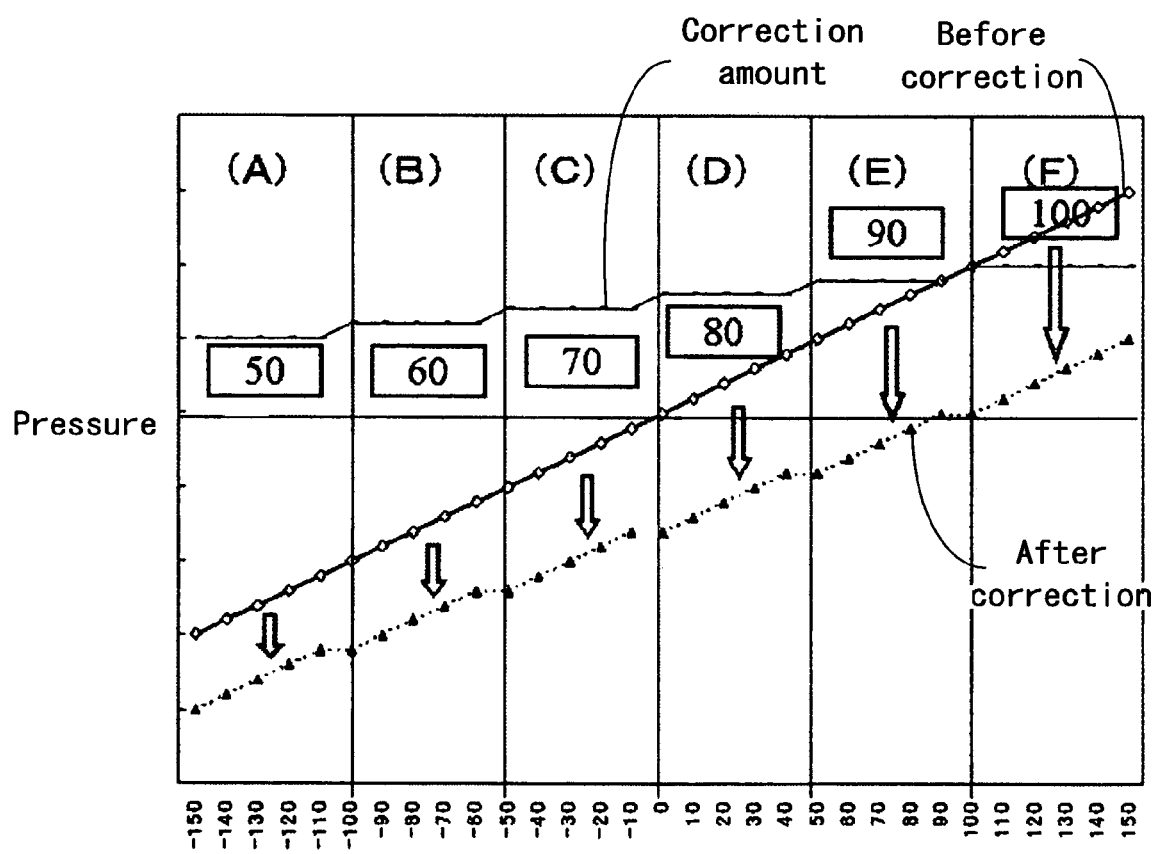
FIG. 11 illustrates a graph for explaining one correction method for the pre-charge maximum time.
Figure 12:
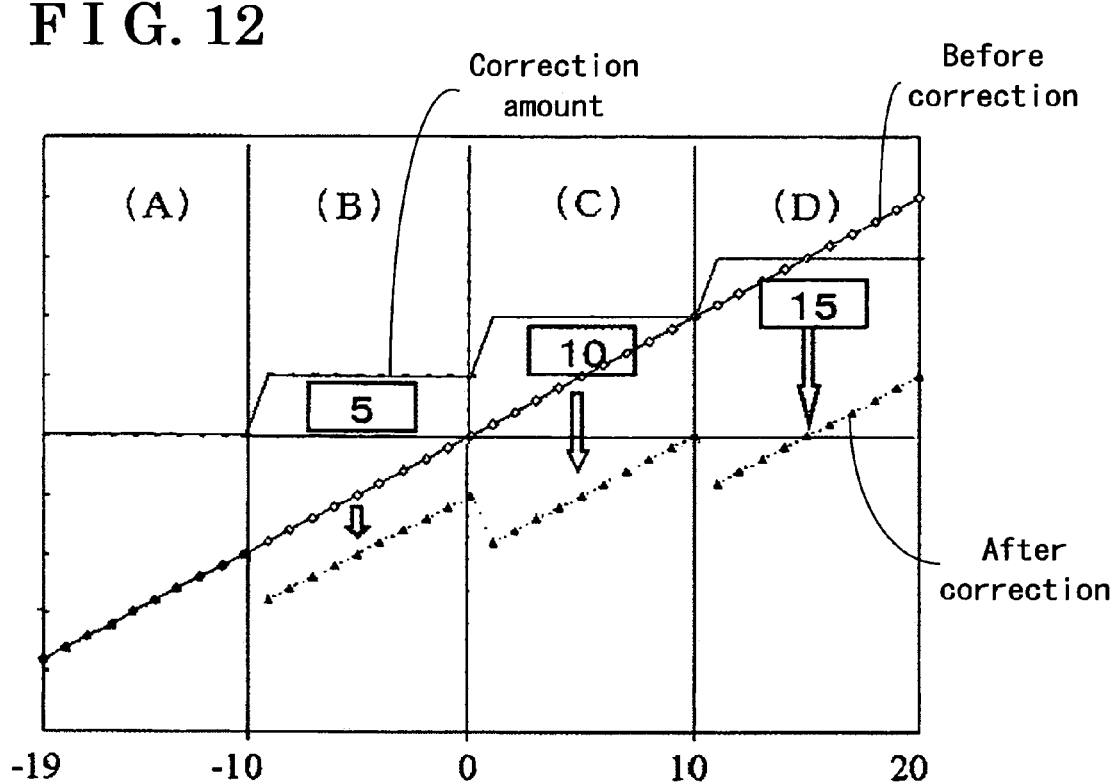
FIG. 12 illustrates a graph for explaining one correction method for the stand-by pressure.

FIG. 11 and FIG. 12 illustrates effects caused by corrections on the pre-charge maximum time and the stand-by pressure. As shown in FIG. 11, the more the uncorrected pre-charge maximum time obtained by the learning control becomes larger, the more the correction amount becomes larger. Thus, the more the incidence of the transmission shock due to vibration of the hydraulic pressure or slow-down on the piston is increased, the more the pre-charge maximum time can be corrected to the safety side (transmission shock is not occurred). Further, as shown in FIG. 12, the more the stand-by pressure obtained by the learning control becomes larger, the more the correction amount becomes larger.

Thus, the more the incidence of the transmission shock due to vibration of the hydraulic pressure or slowdown on the piston is increased, the more the stand-by pressure can be corrected to the safety side (transmission shock is not occurred). In addition, it is prevented that the piston is shocked because of engaged with the end upon the actual transmission so as to disturb the following learning process.

The above correction process should not to be applied on all friction engaging element, and may be applied only on the particular friction engaging element, which has fewer allowance relative to the predetermined threshold.

The learning controls of the pre-charge maximum time and the stand-by pressure may be executed randomly. Further, the learning result of one learning control, which is executed first, can be compared to a standard value or the like so as to be used for calculating the hydraulic pressure characteristic value of the other learning control. Because the pre-charge maximum time depends on the temperature, the pre-charge maximum time may be varied due to hydraulic temperature. It is preferable that the pre-charge maximum time is further corrected in accordance with a temperature map or the like.

Figure 13:
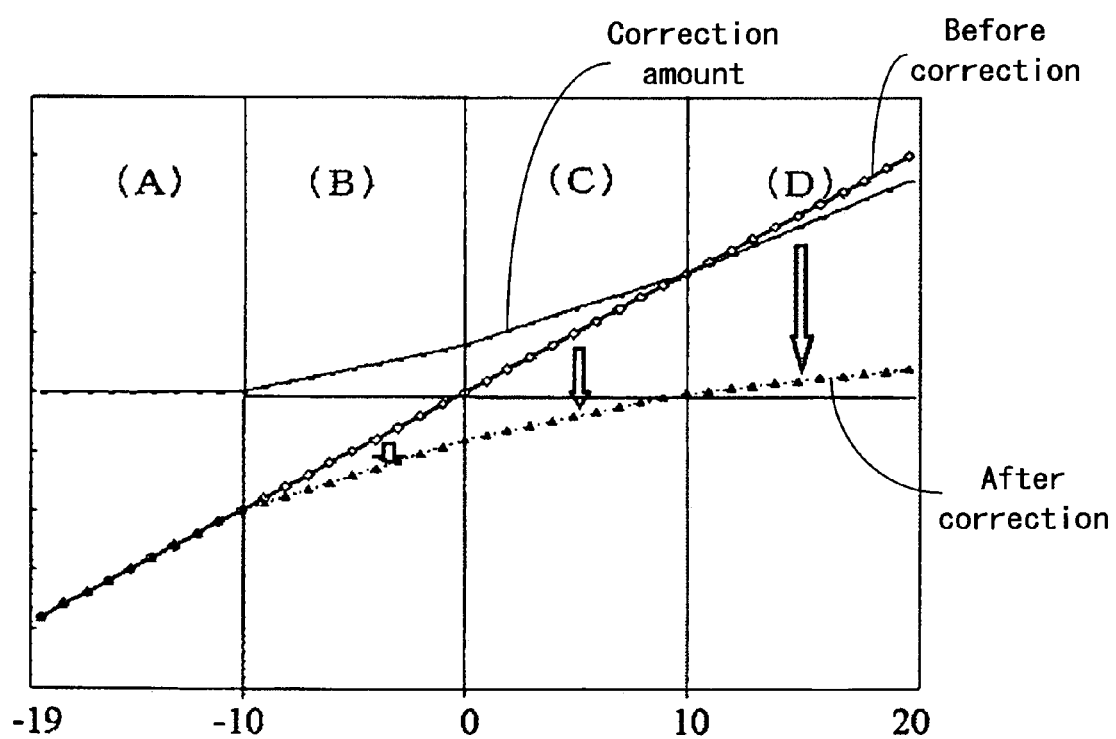
FIG. 13 illustrates a graph for explaining another correction method for the pre-charge maximum time.

In the above example, all standard ranges of the hydraulic pressure characteristic value is divided into a plural consecutive sections, and as the hydraulic pressure characteristic value obtained by the learning control becomes large, the larger correction value is applied based on the correction tables. The sections may be provided on only the upper side of the standard range of the hydraulic pressure characteristic value, or a correction formula corresponding each section may be used instead of the correction value. For example, FIG. 13 illustrates effects of the correction when the correction formulas are used in the sections explained in the example. In comparison with FIG. 12, it is apparent that the correction formulas are provided for the sections so that the corrected stand-by pressure does not exceed the uncorrected stand-by pressure near borders of the sections In the above example, only the turbine rotation number is used for learning the hydraulic pressure characteristic value, however, this invention is not limited to such configuration, another methods disclosed, for example in JP2003-081939A or JP2003-081967, which is filed prior to this application by the applicant, may be used alternatively. In these methods, the hydraulic pressure characteristic value is obtained by calculating the differential between the engine rotation number and the turbine rotation number.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A hydraulic pressure characteristic value setting method for an automatic transmission that includes a control portion and a plurality of friction engaging elements, wherein the control portion controls the plurality of friction engaging elements to be engaged or disengaged by controlling hydraulic pressure applied to the plurality of friction engaging elements so as to achieve a plurality of transmission ratio in accordance with combinations of engagement and disengagement of the plurality of friction engaging elements, the hydraulic pressure characteristic value setting method comprising steps of:
    disengaging one of the plurality of friction engaging elements;
    transmitting turbine rotation to one side of the disengaged friction engaging elements;
    securing other side of the disengaged friction engaging elements;
    detecting variations of speed of the turbine rotation by means of a turbine rotation sensor;
    executing a learning of a hydraulic pressure characteristic value in accordance with at least the variations of speed of turbine rotations when the disengaged friction engaging element starts to be engaged, and
    disengaging the engaged friction engaging element when a predetermined guard condition has been fulfilled.

2. The hydraulic pressure characteristic value setting method for an automatic transmission according to claim 1, wherein the learning is finished when the guard condition has been fulfilled, in which the speed of turbine rotations reaches a speed of guard rotations that is calculated by multiplying the speed of turbine rotations detected when a vehicle is in an idling state, by a predetermined proportion.

3. The hydraulic pressure characteristic value setting method for an automatic transmission according to claim 1, wherein the learning is finished when the guard condition has been fulfilled, in which the speed of turbine rotations exceeds a speed of engine rotations at a predetermined speed.

4. The hydraulic pressure characteristic value setting method for an automatic transmission according to claim 1, wherein the learning is finished when the guard condition has been fulfilled, in which an accelerator pedal opening detected at an accelerator pedal opening sensor exceeds a predetermined threshold at a predetermined speed.

5. The hydraulic pressure characteristic value setting method for an automatic transmission according to claim 1, wherein the guard condition has been fulfilled when a range of variation in the speed of turbine rotations reaches a predetermined speed of rotations, or when a predetermined time has passed after the friction engaging element has moved into an engaged side.

6. The hydraulic pressure characteristic value setting method for an automatic transmission according to claim 5, wherein a pre-charge maximum time obtained on a basis of the variations of the speed of turbine rotations at a time that hydraulic pressure is applied by the control portion to the friction engage element and maintained at a predetermined pressure, is set as the hydraulic pressure characteristic value.

7. The hydraulic pressure characteristic value setting method for an automatic transmission according to claim 5, wherein a stand-by pressure obtained on a basis of the variations of the speed of turbine rotations at a time that hydraulic pressure is applied by the control portion to the friction engage element and is gradually increased, or gradually decreased, in relation to predetermined time periods, and to predetermined step pressures, is set as the hydraulic pressure characteristic value.

8. The hydraulic pressure characteristic value setting method for an automatic transmission according to claim 1, wherein the guard condition is fulfilled when a brake pedal has been released.

9. The hydraulic pressure characteristic value setting method for an automatic transmission according to claim 1, wherein the guard condition is fulfilled when a selector lever has been moved from P range to another range.

10. The hydraulic pressure characteristic value setting method for an automatic transmission according to claim 1, wherein the guard condition is fulfilled when a hydraulic oil temperature is higher or lower than an predetermined appropriate temperature.

11. An automatic transmission that includes a control portion and a plurality of friction engaging elements, wherein the control portion controls the plurality of friction engaging elements to be engaged or disengaged by controlling hydraulic pressure applied to the plurality of friction engaging elements so as to achieve a plurality of transmission ratio in accordance with combinations of engagement and disengagement of the plurality of friction engaging elements, the automatic transmission comprising:
 disengaging means for disengaging one of the plurality of friction engaging elements;
 transmitting means for transmitting turbine rotation to one side of the disengaged friction engaging elements;
 securing means for securing other side of the disengaged friction engaging elements;
 detecting means for detecting variations of speed of the turbine rotation by means of a turbine rotation sensor;
 executing means for executing a learning of a hydraulic pressure characteristic value in accordance with at least variations of the speed of turbine rotations when a friction engaging element starts to be engaged, and
 correcting means for correcting the hydraulic pressure characteristic value by decreasing a correction value from sectioned map in which the correction value defined to increase in a incremental steps in respect of each section.

12. An automatic transmission that includes a control portion and a plurality of friction engaging elements, wherein the control portion controls the friction engaging elements to be engaged or disengaged by controlling hydraulic pressure applied to the friction engaging elements so as to achieve a plurality of transmission ratio in accordance with combinations of engagement and disengagement of the friction engaging elements, the automatic transmission comprising:
 disengaging means for disengaging one of the plurality of friction engaging elements;
 transmitting means for transmitting turbine rotation to one side of the disengaged friction engaging elements;
 securing means for securing other side of the disengaged friction engaging elements;
 detecting means for detecting variations of speed of the turbine rotation by means of a turbine rotation sensor;
 executing means for executing a learning of a hydraulic pressure characteristic value in accordance with at least variations of the speed of turbine rotations when the disengaged friction engaging element starts to be engaged, and
 correcting means for correcting the hydraulic pressure characteristic value based on a formula defined to increase a correction amount as the hydraulic pressure characteristic value increases.

13. The hydraulic pressure characteristic value setting method for an automatic transmission according to claim 9, wherein a pre-charge maximum time obtained on a basis of the variations of the speed of turbine rotations at a time that hydraulic pressure is applied by the control portion to the friction engaging element and maintained at a predetermined pressure, is set as the hydraulic pressure characteristic value.

14. The hydraulic pressure characteristic value setting method for an automatic transmission according to claim 9, wherein a stand-by pressure obtained on a basis of the variations of the speed of turbine rotations at a time that hydraulic pressure is applied by the control portion to the friction engaging element and is gradually increased, or gradually decreased, in relation to predetermined time periods, and to predetermined step pressures, is set as the hydraulic pressure characteristic value.

15. The hydraulic pressure characteristic value setting method for an automatic transmission according to claim 9, wherein a pre-charge maximum time obtained on a basis of the variations of the speed of turbine rotations at a time that hydraulic pressure is applied by the control portion to the friction engaging element and maintained at a predetermined pressure, is set as the hydraulic pressure characteristic value.

16. The hydraulic pressure characteristic value setting method for an automatic transmission according to claim 9, wherein a stand-by pressure obtained on a basis of the variations of the speed of turbine rotations at a time that hydraulic pressure is applied by the control portion to the friction engaging element and is gradually increased, or gradually decreased, in relation to predetermined time periods, and to predetermined step pressures, is set as the hydraulic pressure characteristic value.

* * * * *